(12) United States Patent
Hoag et al.

(10) Patent No.: US 11,267,660 B2
(45) Date of Patent: Mar. 8, 2022

(54) PACKAGE SORTING MACHINE

(71) Applicant: Engineering Innovation, Inc., Lafayette, IN (US)

(72) Inventors: Jason Hoag, Lafayette, IN (US); Donald Caddy, West Lafayette, IN (US); Teresea D. Branson, West Lafayette, IN (US); David Rooze, Crawfordsville, IN (US); Adam W. Fleming, Otterbein, IN (US)

(73) Assignee: Engineering Innovation, Inc., Lafayette, IN (US)

(*) Notice: Subject to any disclaimer, the term of this patent is extended or adjusted under 35 U.S.C. 154(b) by 0 days.

(21) Appl. No.: 16/978,784

(22) PCT Filed: Mar. 11, 2019

(86) PCT No.: PCT/US2019/021575
§ 371 (c)(1),
(2) Date: Sep. 8, 2020

(87) PCT Pub. No.: WO2019/173817
PCT Pub. Date: Sep. 12, 2019

(65) Prior Publication Data
US 2021/0047133 A1 Feb. 18, 2021

Related U.S. Application Data

(60) Provisional application No. 62/640,866, filed on Mar. 9, 2018.

(51) Int. Cl.
*B65G 47/96* (2006.01)
*B65G 47/38* (2006.01)
*B07C 3/08* (2006.01)

(52) U.S. Cl.
CPC .............. *B65G 47/962* (2013.01); *B07C 3/08* (2013.01); *B65G 47/38* (2013.01); *B65G 2201/0235* (2013.01); *B65G 2203/0216* (2013.01)

(58) Field of Classification Search
CPC ...... B65G 43/08; B65G 47/38; B65G 47/962; B65G 2201/0235; B65G 2203/0216;
(Continued)

(56) References Cited

U.S. PATENT DOCUMENTS 2,745,359 A   5/1959   Lunder
3,233,720 A   2/1966   Atanasoff et al.
(Continued)

FOREIGN PATENT DOCUMENTS

DE    30 24 699 A1    1/1982
DE    198 17 437 C2   9/2001
(Continued)

OTHER PUBLICATIONS

English Abstract for WO2011/000349 by Patbase on Aug. 19, 2020 (pp. 38).
(Continued)

*Primary Examiner* — Gene O Crawford
*Assistant Examiner* — Keith R Campbell
(74) *Attorney, Agent, or Firm* — Woodard, Emhardt, Henry, Reeves & Wagner, LLP

(57) ABSTRACT

A device for sorting an item into containers on the side or sides of the device that includes several interconnected bogie assemblies movable in a direction, each bogie assembly includes a base, a right arm rotatable mounted on the base, a left arm rotatable mounted on the base, a right release that holds the right arm in a transport position, and a left release that holds the left arm in a transport position such that when both the right and left arms are in the transport (Continued)

position, the bogie assemblies move the item in the direction along the path and actuating the right release dumps the item into a right side container located on a right side of the device and actuating the left release dumps the item into a left side container located on a left side of the device.

25 Claims, 23 Drawing Sheets

(58) Field of Classification Search
CPC .... B65G 2203/0233; B65G 2203/0283; B07C 3/08; B07C 3/082
USPC ..................................................... 198/370.04
See application file for complete search history.

(56) References Cited

U.S. PATENT DOCUMENTS

| | | | |
|---|---|---|---|
| 3,848,728 A * | 11/1974 | Lei ............................ | B61B 9/00 198/370.04 |
| 3,863,658 A | 2/1975 | Kramb et al. | |
| 3,945,485 A * | 3/1976 | Speaker ............... | B65G 47/962 198/370.04 |
| 4,102,448 A * | 7/1978 | Wolbrink ............. | B65G 47/962 104/245 |
| 4,586,613 A | 5/1986 | Horii | |
| 4,993,535 A * | 2/1991 | Scata .................... | B65G 47/965 198/370.04 |
| 5,433,311 A | 7/1995 | Bonnet | |
| 5,746,301 A * | 5/1998 | Maier .................. | B65G 47/962 198/370.04 |
| 6,082,522 A | 7/2000 | Polling | |
| 6,234,297 B1 | 5/2001 | Blanc | |
| 6,460,681 B1 * | 10/2002 | Coutant .................... | B07C 3/06 198/370.03 |
| 6,827,198 B1 | 12/2004 | Costanzo | |
| 6,874,614 B2 | 4/2005 | Heitplatz | |
| 7,337,892 B2 * | 3/2008 | Groot ................... | B65G 17/066 198/369.3 |
| 8,857,625 B1 | 10/2014 | Oropeza | |
| 10,000,346 B2 * | 6/2018 | Berdelle-Hilge .... | B65G 47/965 |
| 2004/0079618 A1 | 4/2004 | Abildgaard et al. | |
| 2009/0078618 A1 | 3/2009 | Stemmle et al. | |
| 2016/0280472 A1 | 9/2016 | Porat et al. | |

FOREIGN PATENT DOCUMENTS

| | | |
|---|---|---|
| GB | 1105602 A | 3/1968 |
| GB | 2 014 933 B | 9/1979 |
| JP | 02086509 A | 3/1990 |
| WO | WO 2011/00349 A2 | 1/2011 |

OTHER PUBLICATIONS

English translation of DE19817437C2 by Patent Translate European Patent Office on Aug. 19, 2020 (pp. 25).
English translation of DE3024699A1 by Patbase on Aug. 19, 2020 (17 pgs).
International Search Reported received in related PCT/US2019/021575 dated Jun. 10, 2019.
Machine Translation of Abstract for JP02086509A by Lexis Nexis Total Patenton Jul. 5, 2016.
Written Opinion issued in related PCT/US2019/021575 dated Apr. 30, 2019.

* cited by examiner

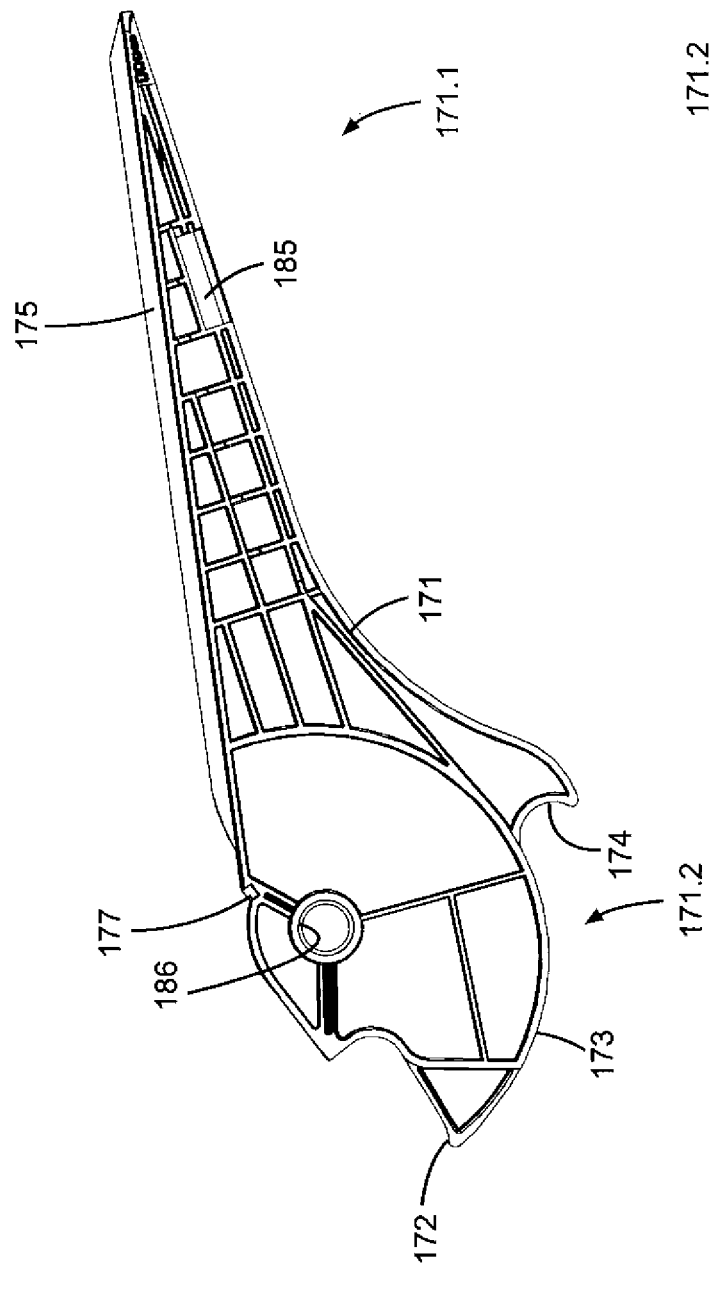
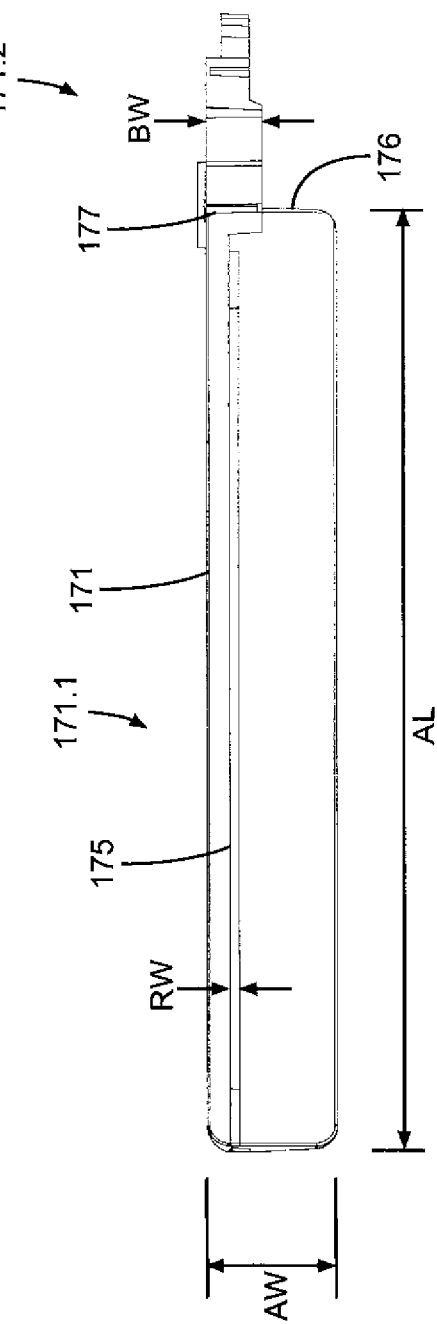

PACKAGE SORTING MACHINE

CROSS-REFERENCE TO RELATED APPLICATIONS

This application is a national stage application of PCT/US2019/021575 filed Mar. 11, 2019, which claims the benefit of U.S. Provisional Application No. 62/640,866, filed Mar. 9, 2018, which are both hereby incorporated by reference.

FIELD OF THE INVENTION

This disclosure is related to the field of sorting conveyors.

BACKGROUND

There is a need for improved devices to sort items.

BRIEF DESCRIPTION OF THE DRAWINGS

FIG. 17 is a side elevational view of the FIG. 15 arm body.

FIG. 18 is a top plan view of the FIG. 15 arm body.

DETAILED DESCRIPTION OF THE DRAWINGS

Figure 1:
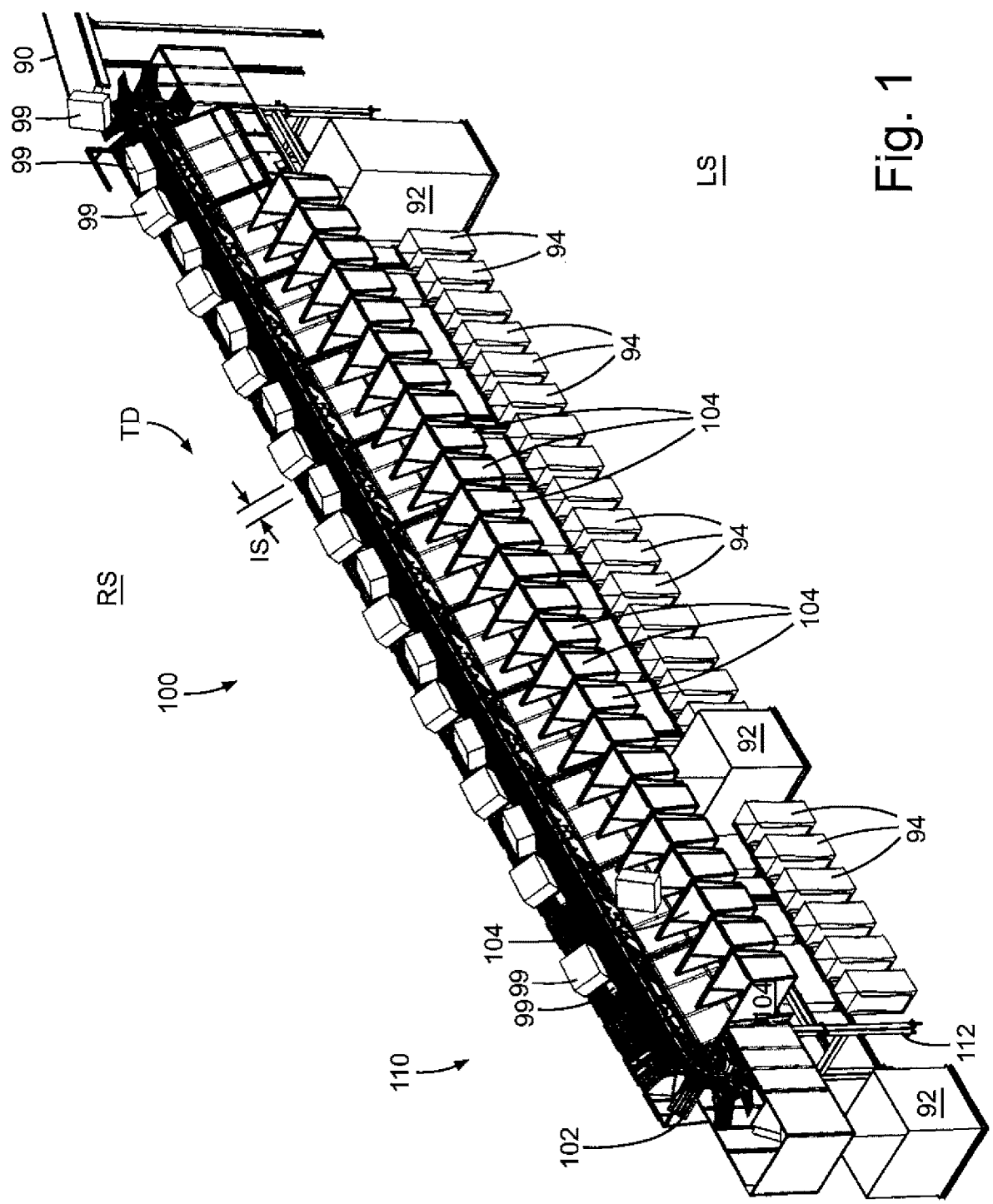
FIG. 1 is a perspective view of a sorting conveyor system.

While the claimed invention may be embodied in many different forms, for the purpose of promoting an understanding of the principles of the claimed invention, reference will now be made to the embodiments illustrated in the drawings, and specific language will be used to describe the same. It will nevertheless be understood that no limitation of the scope of the claimed invention is thereby intended. Any alterations and further modifications in the described embodiments and any further applications of the disclosed principles as described herein are contemplated as would normally occur to one skilled in the art to which the claimed invention relates.

Some of the figures shown herein may include dimensions. Further, many of the figures shown herein have been created from scaled drawings. It is understood that such dimensions, or the relative scaling within a figure, are by way of example, and not to be construed as limiting. However, FIGS. 1-30 are produced from scaled solid models of particular components of the claimed device and specific dimensional ratios are claimed. Because the figures are scaled, applicant reserves the right to later claim dimensional ratios that are not specifically labeled.

Referring to FIG. 1 conveyor 100 is illustrated. Conveyor 100 is a sorting system that allows sorting into containers on either side of the conveyor. Conveyor 100 includes a multitude of individually movable arm elements that together form a conveyor surface. Actuation of individual or several arm elements permit items being conveyed to be dumped to either side of the conveyor and to destination containers.

Referring to FIG. 1, conveyor 100 is illustrated. Conveyor 100 receives items 99 from feed conveyor 90. Conveyor 100 transports the items down the length of conveyor 100 in travel direction TD. A plurality of chutes 104 are located on both sides of conveyor 100 that receives items 99 that are dumped off the conveyor to the left or right of conveyor 100 as described below. Receptacles such as the illustrated large container 92 and small container 94 may be located below each chute 104 to receive the item being sorted after passing through an individual chute 104. Individual containers 92 or 94 may generally be associated with a particular destination or sorting paradigm. For example, in a mail package sorting arrangement, each container could be associated with a particular zip code break having varying degrees of granularity such as a five-digit zip code break. Similarly, conveyor 100 could be used with a shipping distribution system with individual containers associated with different shipping destinations. Individual containers could be associated with individual distribution vehicle for example.

Figure 2:
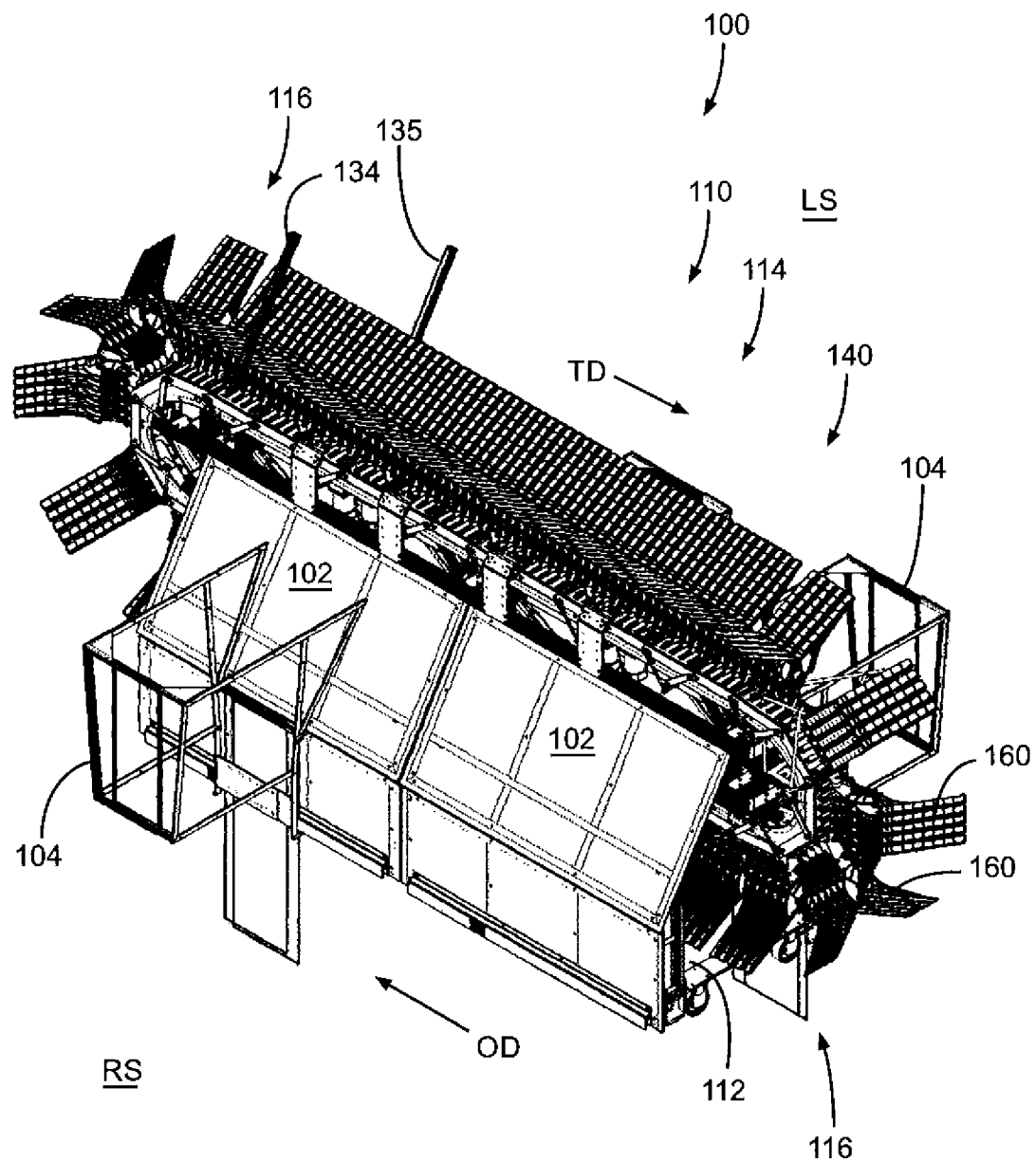
FIG. 2 is a perspective view of a sorting conveyor system similar to the FIG. 1 sorting conveyor but with a shorter overall length.
Figure 3:
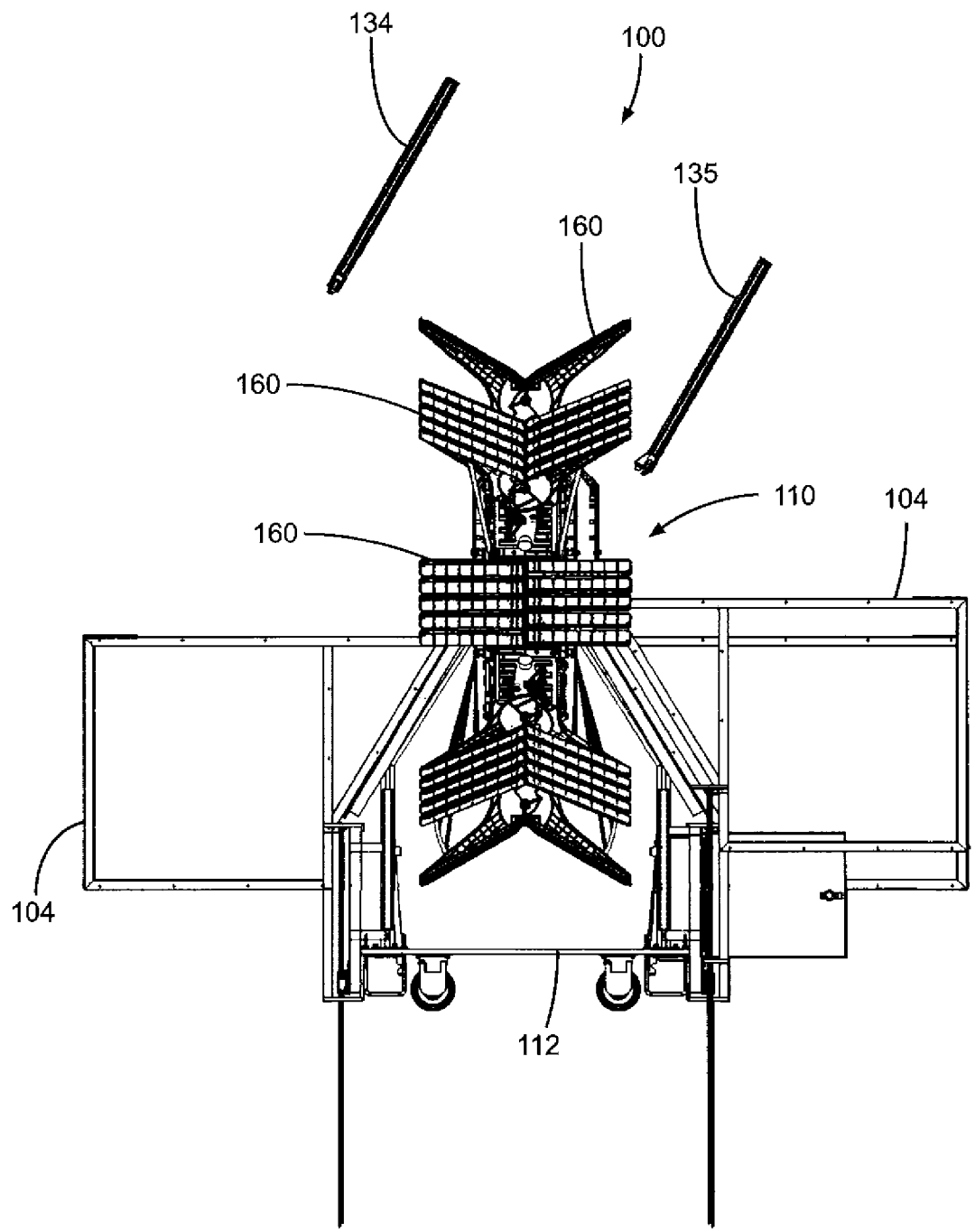
FIG. 3 is an end elevational view of the FIG. 2 conveyor.
Figure 4:
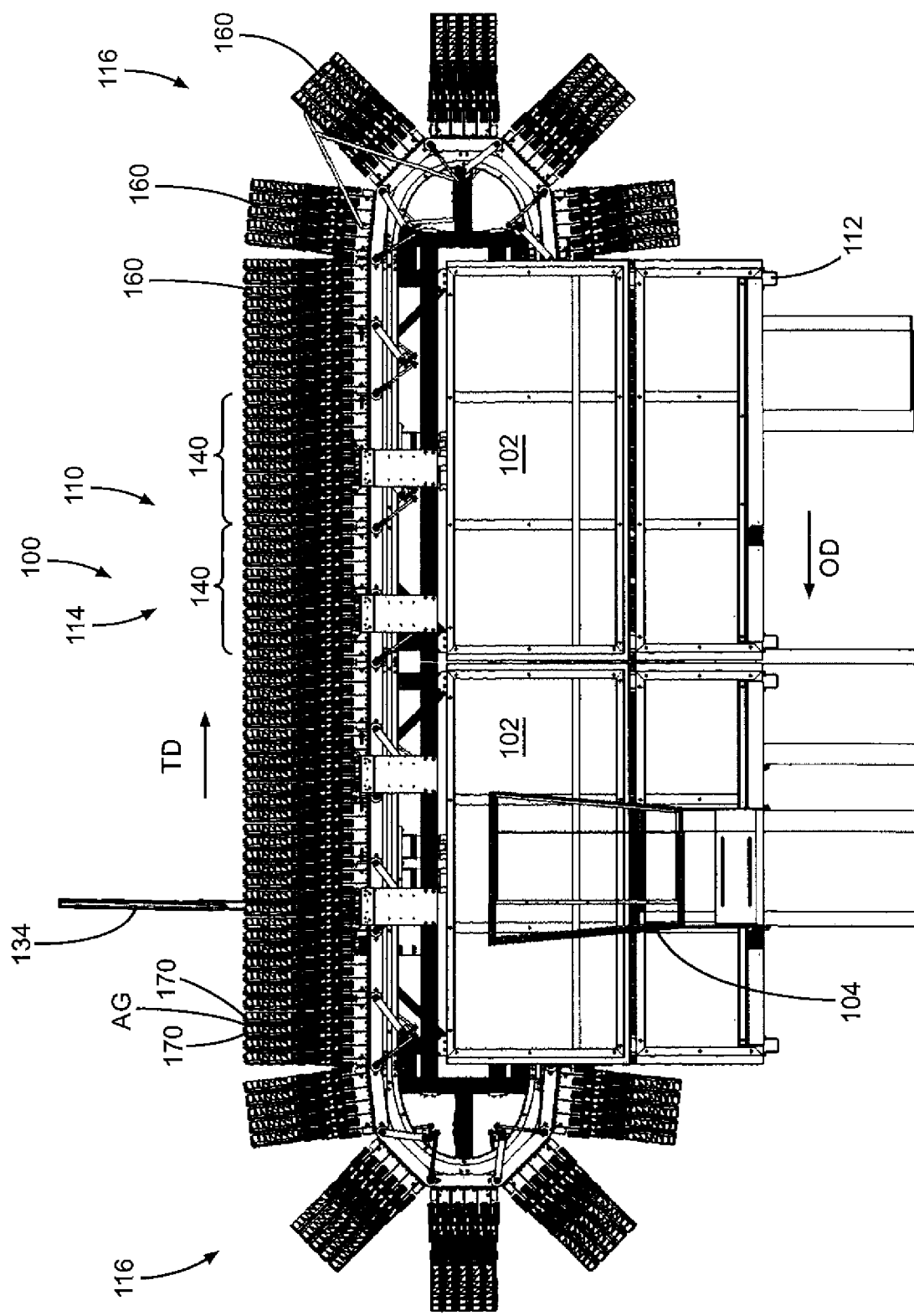
FIG. 4 is a side elevational view of the FIG. 2 conveyor.

Referring now to FIGS. 2-4, conveyor 100 is illustrated in more specific detail. It should be noted that conveyor 100 in FIGS. 2-4 is shorter than the conveyor 100 illustrated in FIG.

1. As described below, the overall length of conveyor 100 is adjustable by adding or removing middle portions to lengthening or shortening the conveyor track. FIGS. 2-4 illustrate a shorter conveyor for convenience and to allow greater detail to be illustrated in the drawings. It should be understood that the length of conveyor 100 is not limited and, as described below, conveyor 100 is designed to be configured in multiple different lengths.

Conveyor 100 generally includes track circuit 110 elevated by frame 112. Track circuit 110 includes one or more straight track assemblies 114 and end track assemblies 116 on either end of conveyor 100. Conveyor 100 further includes skirting 102 on either side of conveyor 100. Skirting may serve as a guard for portions of track circuit 110 and may also assist in directing items 99 through chutes 104. Conveyor 100 includes a multitude of master assemblies 140 sequentially interconnected to each other around the circumference of track circuit 110 in a vertical loop. Master assemblies 140 travel along track circuit 110 in travel direction TD along the top of conveyor 100 and in opposite direction OD on a return leg underneath conveyor 100. As shown, conveyor 100 defines a continuous loop of master assemblies 140. Each master assembly 140 includes a plurality of bogie assemblies 160.

Conveyor 100 also includes item sensor emitter 134 and item sensor receiver 135 positioned to detect items located on the top of conveyor 100. As described below, each bogie assembly 160 includes a plurality of arm assemblies separated from each other by gap AG. Item sensor receiver 135 may detect emissions from item sensor emitter 134 that pass through gap AG when an item 99 is positioned across a gap AG, sensor receiver 135 can detect the item 99 in the gap AG between two arm assemblies 170. As described below, this data can be used to correlate the position of a particular item 99 with particular arm assemblies 170.

Figure 5:
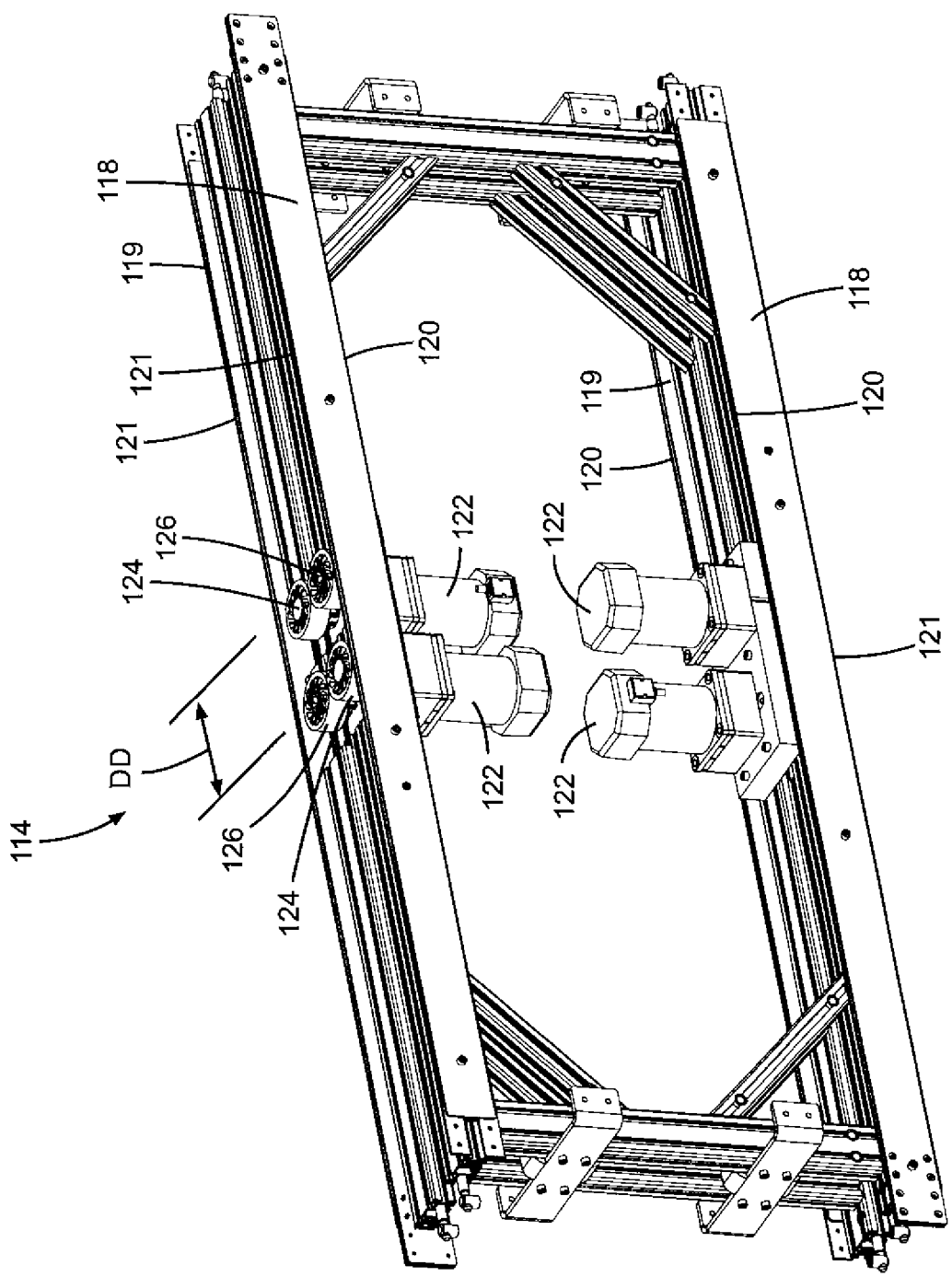
FIG. 5 is a perspective view of a straight track assembly, a component of the FIG. 2 conveyor.

Referring now to FIG. 5, straight track assembly 114 is illustrated. Straight track assembly 114 includes a right track 118 and left track 119 on both the tip and bottom of straight track assembly 114 with both right and left tracks 118 and 119 defining inner path 120 and outer path 121. Straight track assembly 114 includes a plurality of motors 122 connected to drive wheels 124 positioned between right and left tracks 118 and 119. Paired with each drive wheel 124 is an idler wheel 126 that is mounted opposite drive wheel 124 and generally in abutting contact creating a pinch point so that the movement of drive wheel 124 also moves idler wheel 126. As illustrated in FIG. 5, motors 122 are mounted in pairs on the top and bottom of straight track assembly 114 and in each pair of drive wheels 124, the axis of rotation of drive wheels 124 spaced apart by distance DD.

Figure 6:
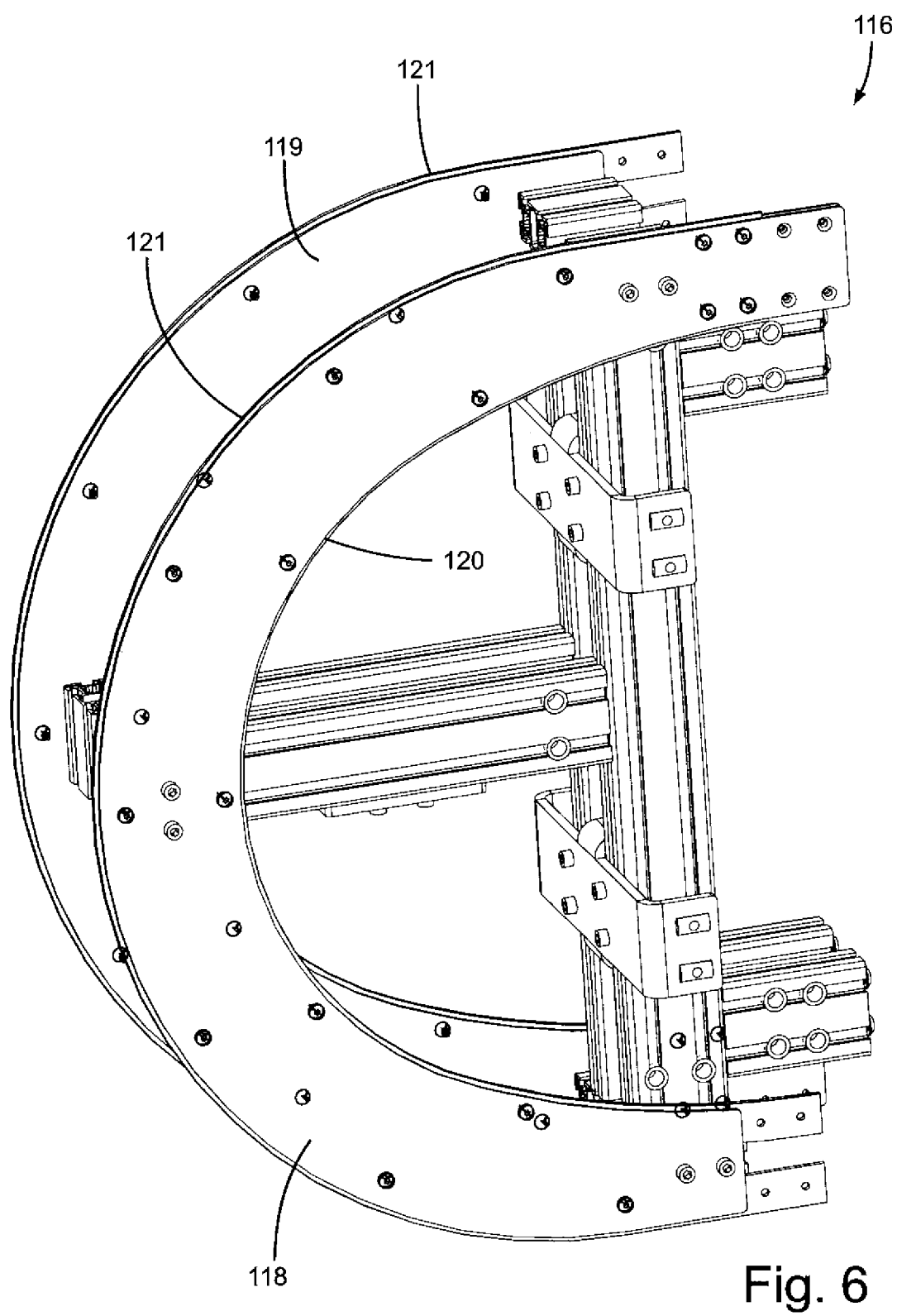
FIG. 6 is a perspective view of an end track assembly, a component of the FIG. 2 conveyor.

Referring now to FIG. 6, end track assembly 116 is illustrated. End track assembly 116 includes right track 118 and left track 119 with both right and left tracks 118 and 119 defining an inner path 120 and an outer path 121. End track assembly 116 is configured to be mounted on both ends of one or more corrected straight track assemblies 114 to complete a loop. In most installations a multitude of straight track assemblies 114 would be connected in series within end track assembly 116 being positioned on either end of the assembled straight track assembly 114 series to create looped track circuit 110.

Figure 7:
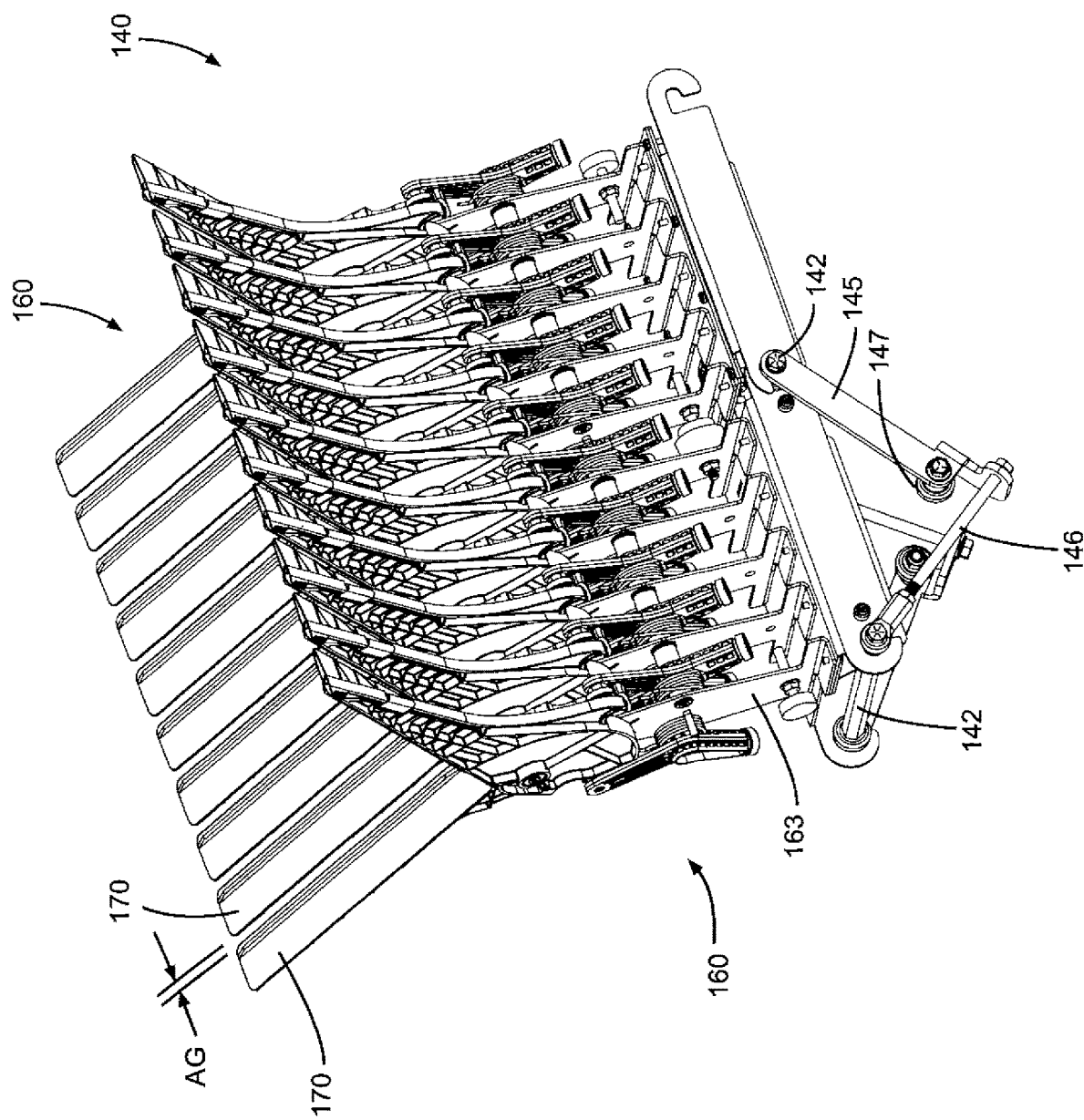
FIG. 7 is a perspective view of a master link assembly, a component of the FIG. 2 conveyor.
Figure 8:
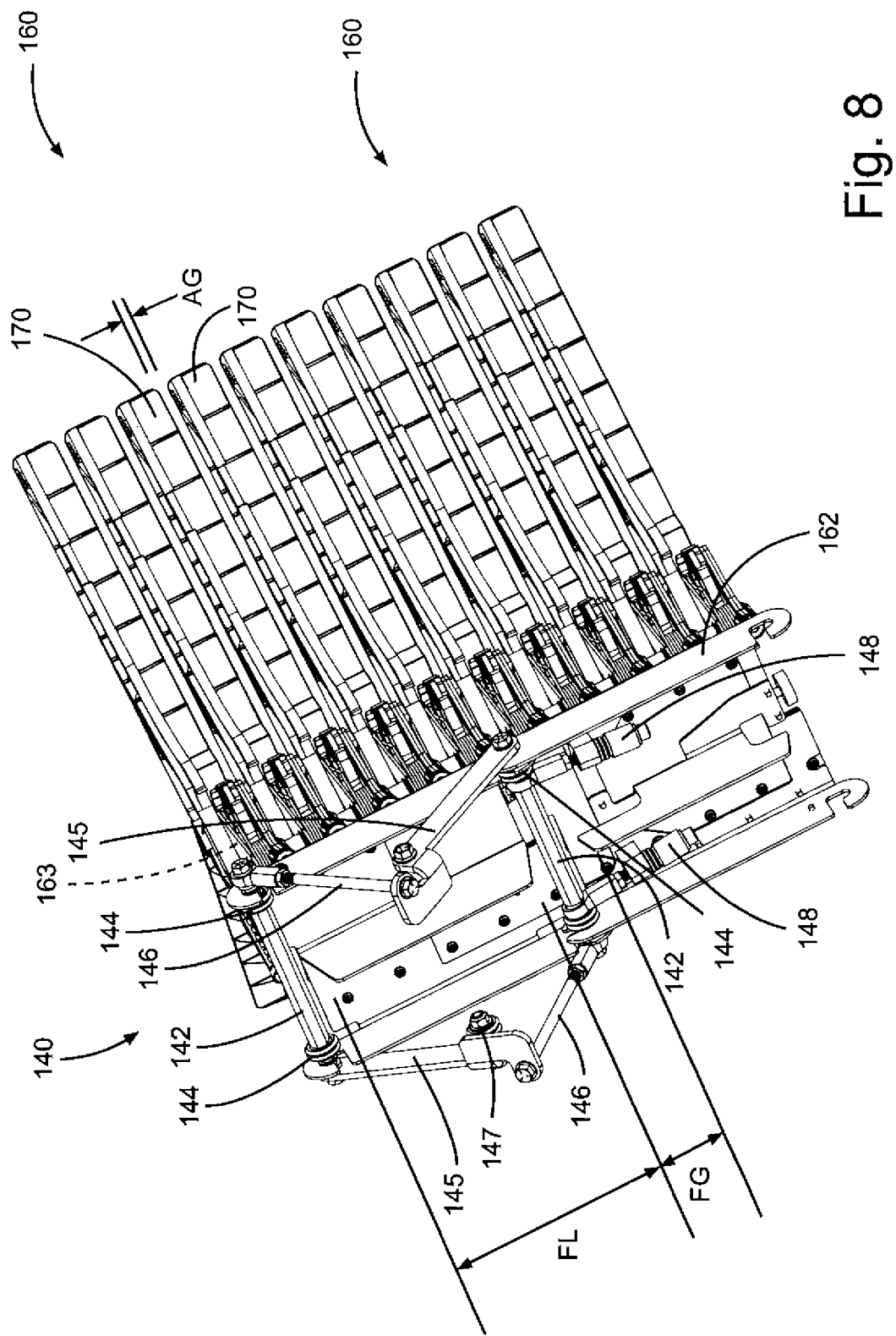
FIG. 8 is a bottom perspective view of the FIG. 7 master link assembly.

Referring now to FIGS. 7 and 8, master assembly 140 is illustrated. Master assembly 140 includes a pair of bogie assemblies 160, rod members 142, outside wheels 144, fixed linkage 145, adjustable linkage 146, inside wheels 147 and connecting assembly 148. Each bogie assembly includes a plurality of arm assemblies 170 separated gaps AG. Each arm assembly 170 is attached to an extension 163 that is attached to base cart 162. Rod members 142 serve to connect adjacent base carts 162 as well as to attach fixed linkage 145 and adjustable linkage 146 to master assembly 140. Connecting rods 142 further mount outside wheels 144 while fixed linkage 145 mounts inside wheels 147. Fixed linkage 145 and adjustable linkage 146 are attached to each other opposite the couplings to connecting rods 142.

Each master assembly 140 includes connecting assembly 148 attaching one base cart 162 to a rod member 142 to secure the illustrated adjacent base carts 162 together.

Figure 9:
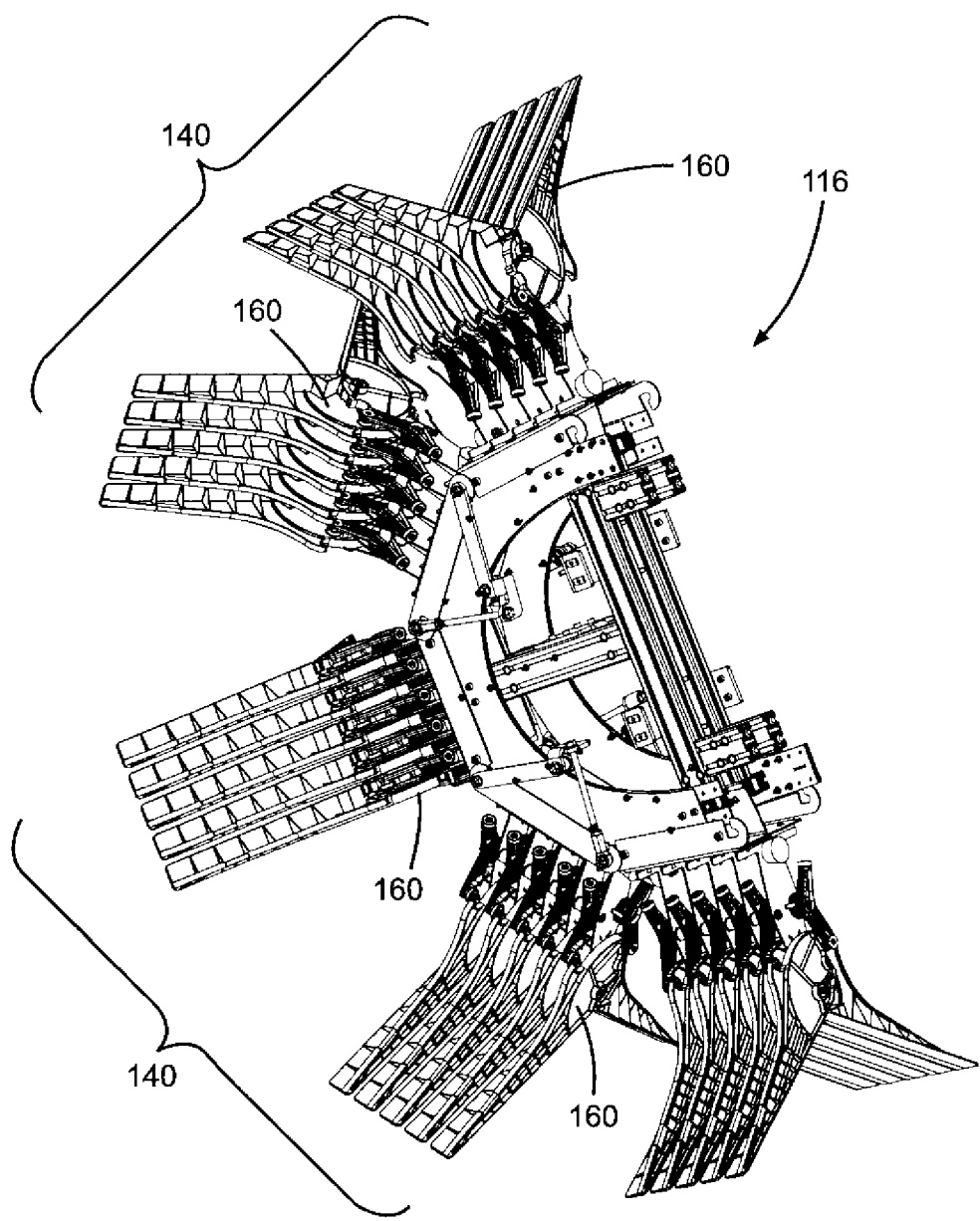
FIG. 9 is a perspective view of select components of the FIG. 2 conveyor including the FIG. 6 end track assembly and several FIG. 7 master link assemblies.

Referring now to FIG. 9, end track assembly 116 is illustrated with a plurality of master assemblies 114 mounted onto end track assembly 116. As shown in FIG. 9, inside wheels 147 ride along inner path 120 and outside wheels 144 ride on outer path 121. Fixed linkage 145 and adjustable linkage 146 retain the master assembly 140 to move along the path defined by inner path 120 and outer path 121.

Figure 10:
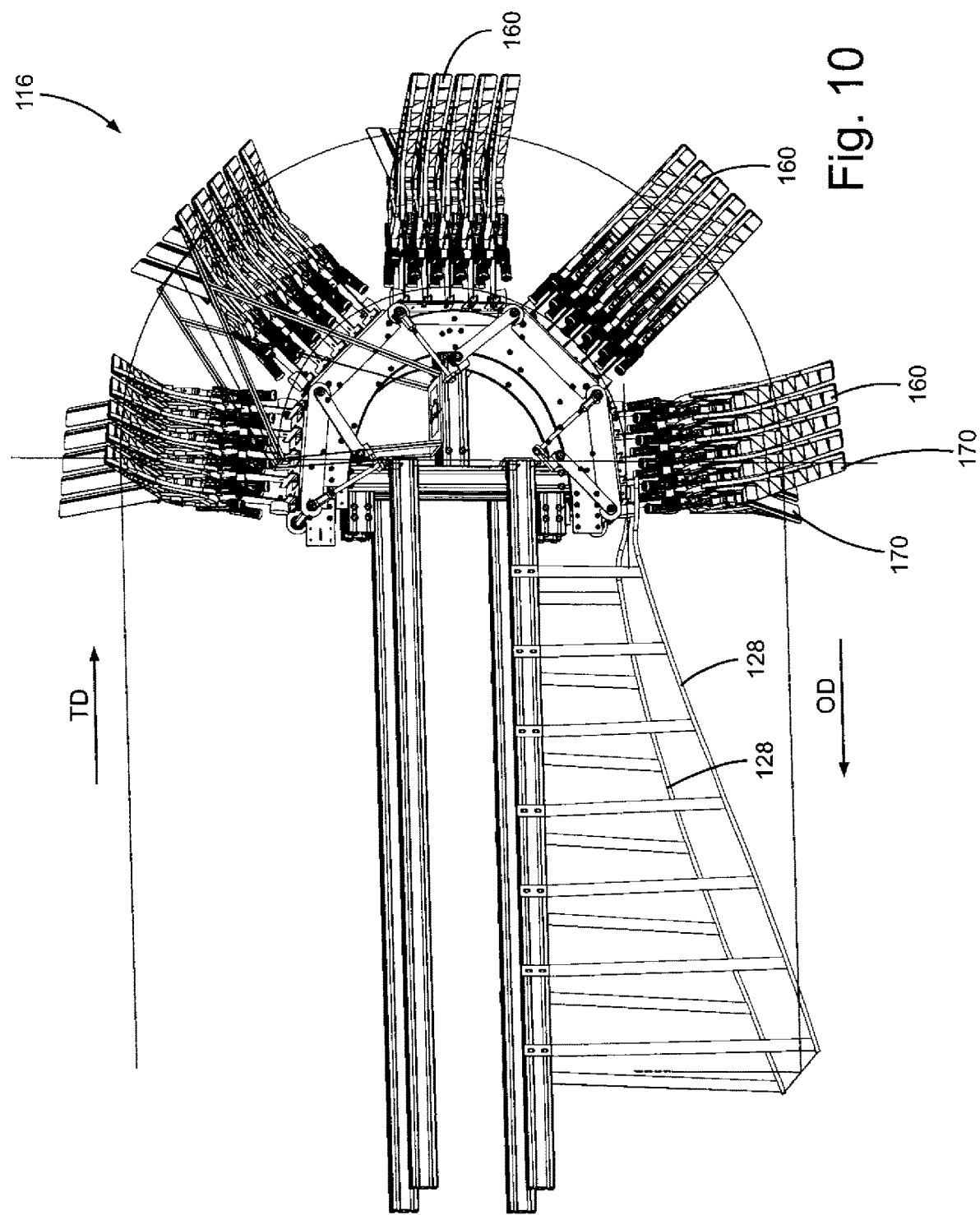
FIG. 10 is a perspective view of the end track assembly showing reset rails.

Referring now to FIG. 10, end track assembly 116 is illustrated mounted on a portion of the inner support structure of a straight track assembly 114. In particular, FIG. 10 shows reset rails 128 mounted below straight track assembly 114 starting at the bottom end of end track assembly 116. As described below in greater detail, reset rails 128 function to reset the position of individual arm assembly 170 when arm assemblies 170 are released during operation of conveyor 100.

Figure 11:
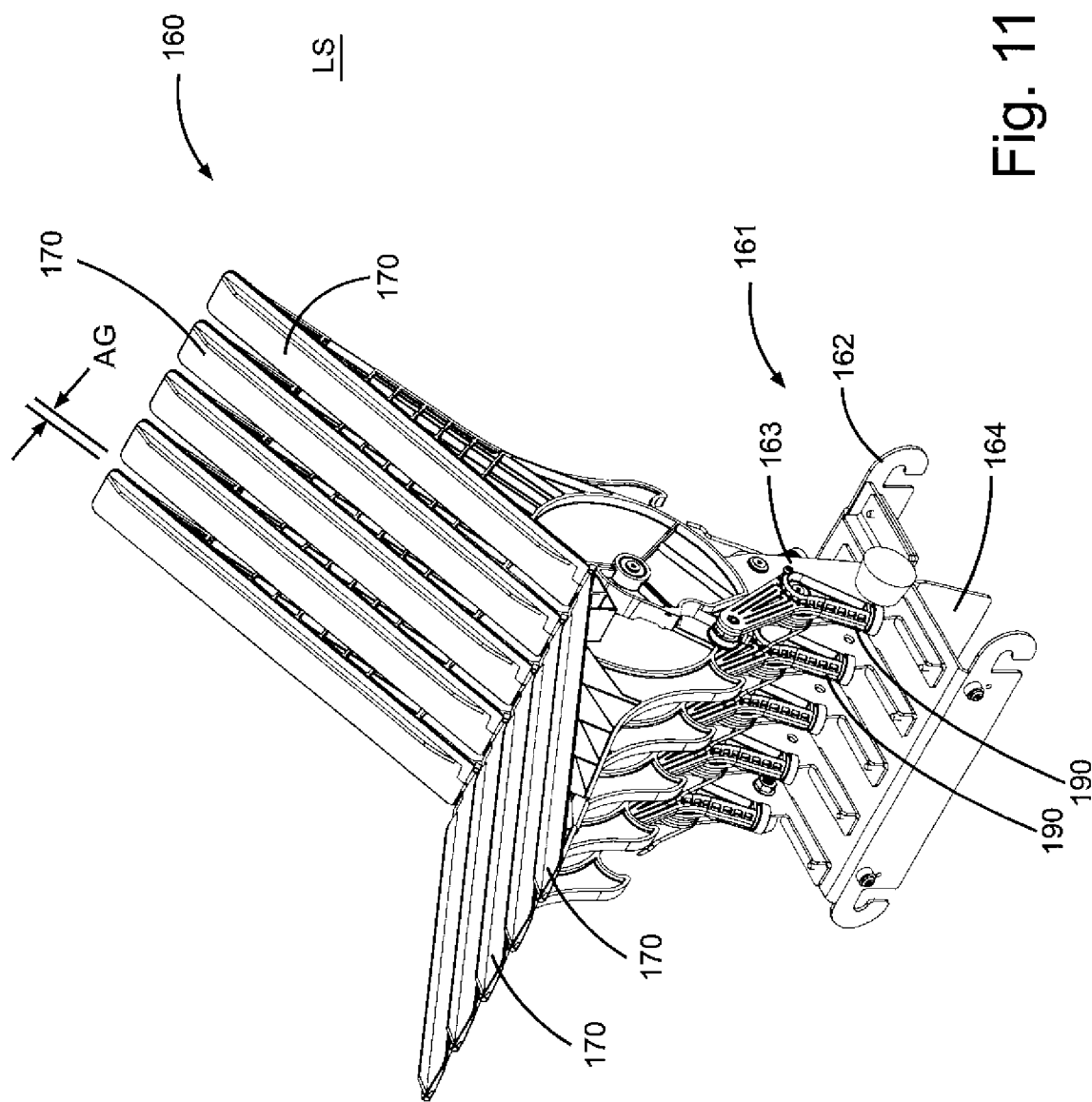
FIG. 11 is a perspective view of a bogie assembly, a component of the FIG. 7 master link assembly.
Figure 12:
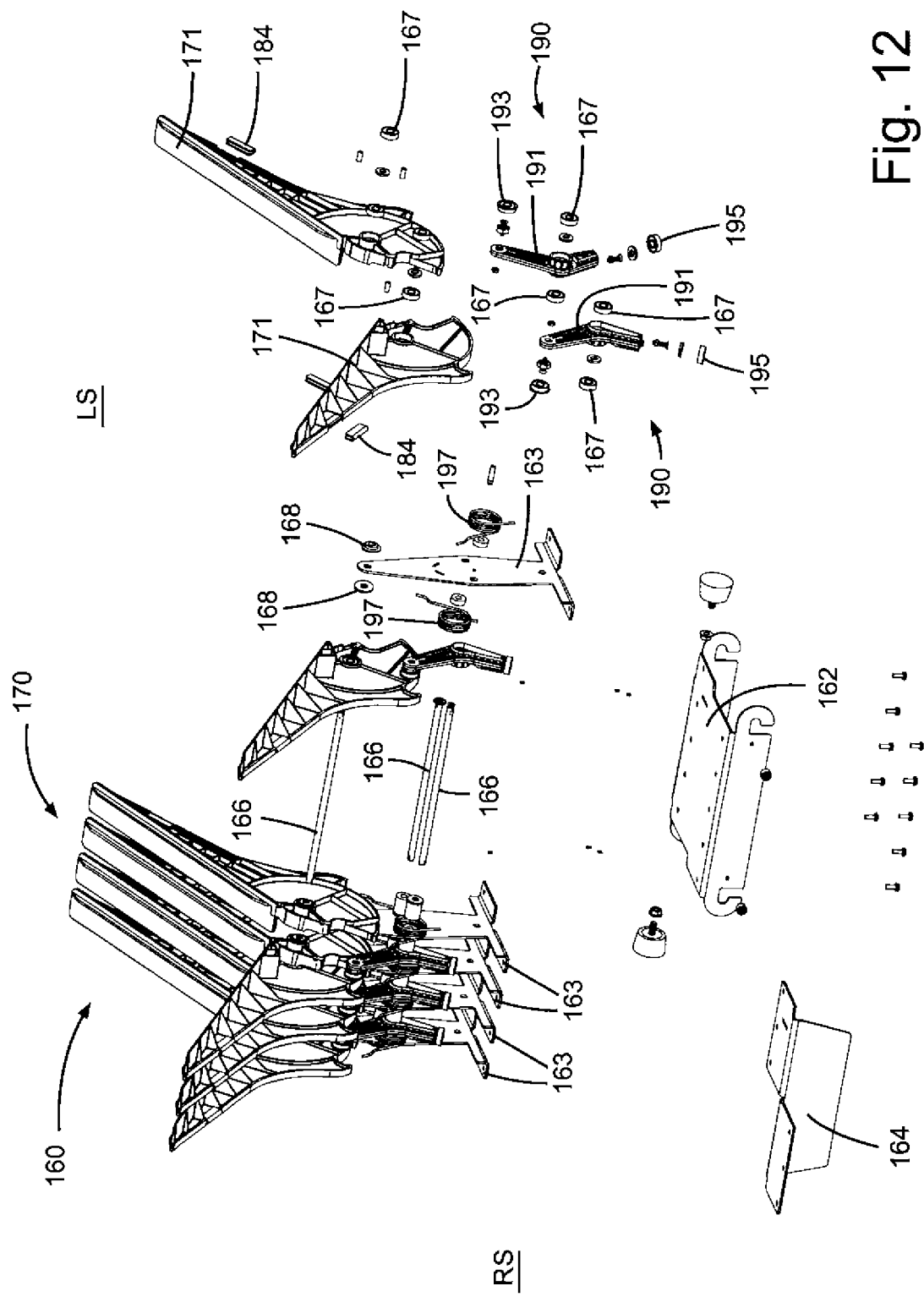
FIG. 12 is an assembly view of the FIG. 11 bogie assembly.
Figure 13:
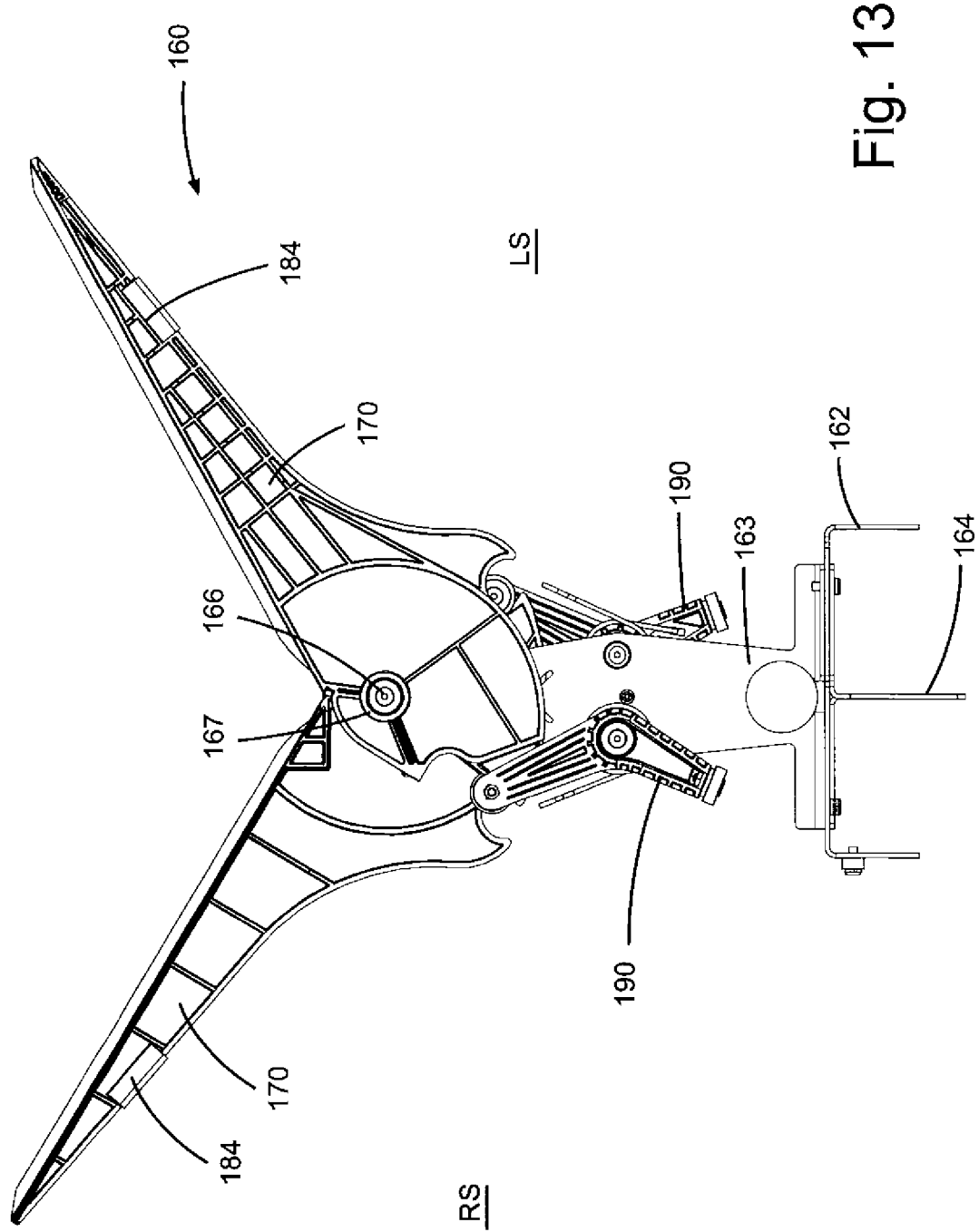
FIG. 13 is an end elevational view of the FIG. 11 bogie assembly.

Referring now to FIGS. 11-13, a bogie assembly 160 is illustrated. Bogie assembly 160 includes a base assembly 161, base cart 162, extension 163, drive fin 164, rod 166, bearing 167, spacer 168, arm assemblies 170 and release levers 190. Arm assemblies 170 are arrange in pairs separated by gap AG between each arm.

As best seen in FIG. 12, bogie assembly 160 includes a plurality of extensions 163 mounted to and extending away from base cart 162. Two arm assemblies 170 and two release levers 190 are mounted on each extension 163, with one arm assembly 170 positioned on a right side of bogie assembly 160 and one arm assembly 170 positioned on a left side of bogie assembly 160. Similarly, one release lever 190 is mounted on the right side of each extension 163 and one release lever 190 is mounted on the left side of each extension 163.

A rod 166 extends through all the arm assemblies 170 and extension 163 mounted on base cart 162, with rod 166 defining a common axis of rotation for all the arm assemblies 170. Similarly, a second rod 166 extends through each extension 163 and the release levers located on the right side of extension 163 defining a common axis of rotation for the right side release levers and a third rod 166 extends through each extension 163 and the release levers located on the left side of extension 163 defining a common axis of rotation for the left side release levers.

Arm assemblies 170 and release levers 190 each include bearings 167 that rotationally couple arm assemblies 170 and release levers 190 to rods 166. Bogie assembly 160 also includes spacers 168 positioned between adjacent bearings 167 to preserve independent rotation of each component part and to maintain a consistent gap AG between adjacent arm assemblies 170.

As described below in greater detail, each arm assembly 170 is paired with a release lever 190 that is positioned on the opposite side of extension 163. (i.e., each right side arm assembly 170 is paired with a left side release lever 190 and each left side arm assembly 170 is paired with a right side release lever 190.) Arm assemblies 170 are arranged as paired sets on each extension 163 with each pair of arm assemblies being arranged in the same space such that gaps AG between adjacent arm assemblies 170 align on the right and left sides of bogie assemblies 160 as best seen in FIG. 8.

Drive fin 164 is mounted on base cart 162 opposite extensions 163. As shown in FIG. 8, each drive fin 164 has a length FL. When bogie assemblies 160 and master assemblies 140 are assembled together in a continuous chain, adjacent fins are spaced apart by fin gap FG. Drive fins 164 are configured to pass through the pinch points between drive wheel 124 and idler wheel 126 so that drive wheel 124 can propel bogie assembly 160 along track circuit 110. Fin length FL can be longer than distance DD between wheel pairs and fin gap can be shorter than distance DD to ensure positive engagement between at least one drive wheels 124 and at least one drive fin 164 at all times.

Figure 14:
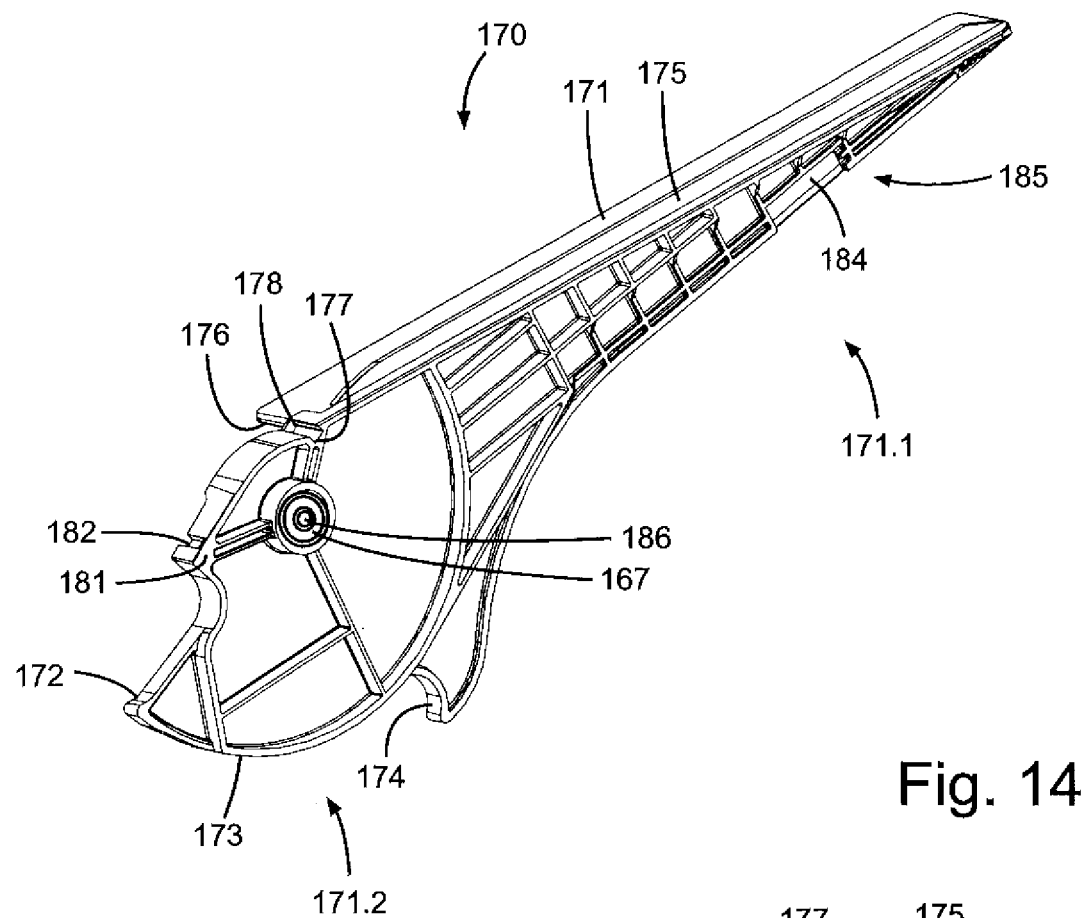
FIG. 14 is a perspective view of an arm assembly, a component of the FIG. 11 bogie assembly.
Figure 15:
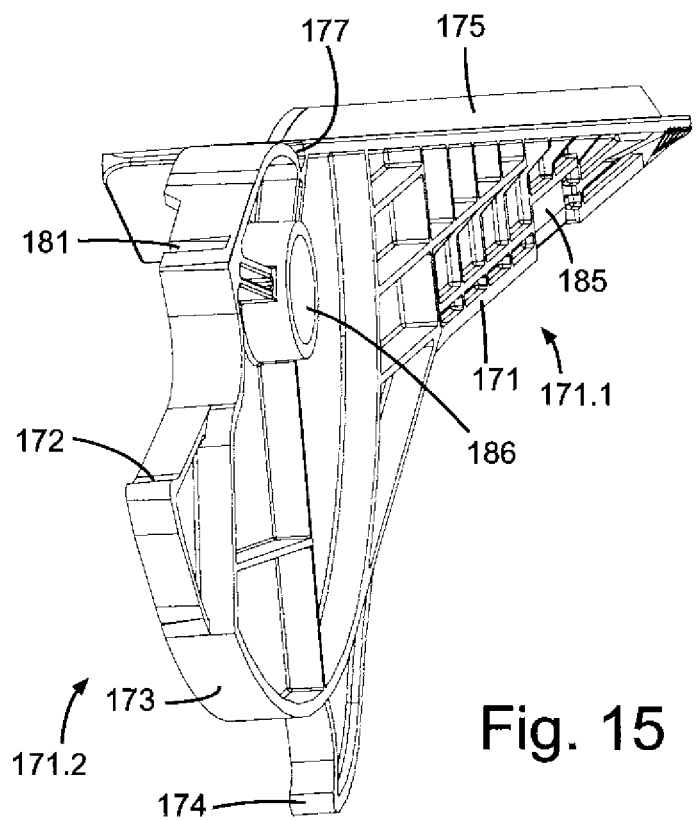
FIG. 15 is an front perspective view of an arm body, a component of the FIG. 14 arm assembly.
Figure 16:
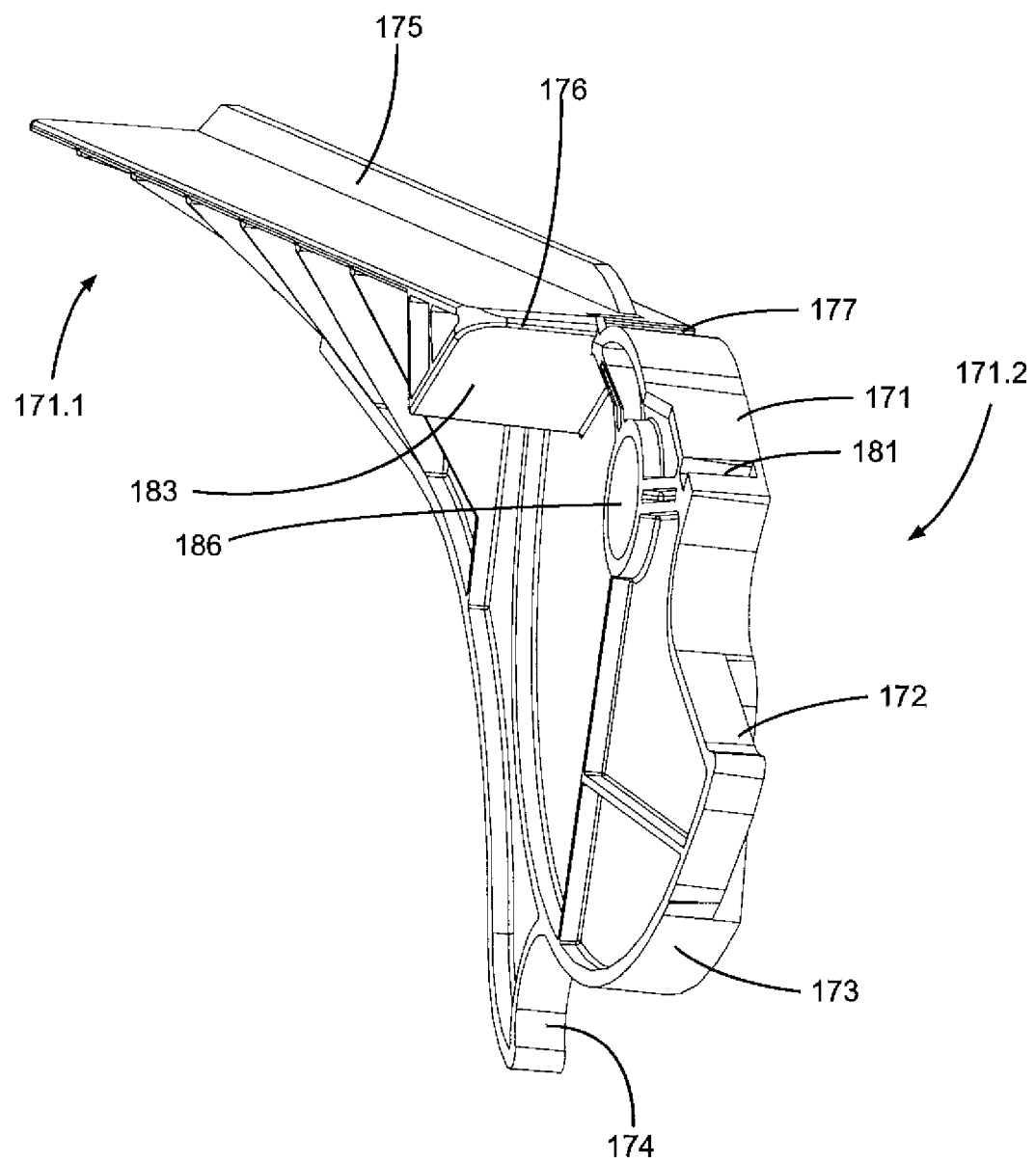
FIG. 16 is a back perspective view of the FIG. 15 arm body.

Referring to FIG. 14, arm assembly 170 is illustrated. Arm assembly 170 generally includes arm body 171, wear bar 184, resilient member 178 and resilient member 182.

Referring to FIGS. 15-18, arm body 171 is illustrated. Arm body 171 generally includes two portions, transport portion 171.1 and body portion 171.2. Transport portion 171.1 is the extended arm portion of arm body 171 that primarily serves to support item 99 during transport on conveyor 100. Body portion 171.2 is the enlarged body through which rod 166 passes and defines the surfaces that interact with release lever 190 to control the movement and positioning of transport portion 171.1 as described below.

Arm body 171 defines several features including retention notch 172, cam surface 173, stop notch 174, ridge 175, transport shoulder 176, notch 177, transport shoulder 179, dump shoulder 180, notch 181, dump shoulder 183, wear bar recess 185 and hole 186. As shown in FIG. 18, transport portion 171.1 defines and area that can support an item being moved with arm body 171 that has an arm length AL and an arm width AW. Arm length AL may be much longer comparatively than arm width AW. For example, arm length AL may be more than 3 times as long as arm width AW. In another example, arm length AL may be more than 6 times as long as arm width AW. In yet another example, arm length AL may be more than 9 times as long as arm width AW. Also as shown in FIG. 18, ridge 175 has a ridge width RW and body portion 171.2 has a body width BW. Ridge width RW may be substantially narrower than arm width AW. For example, ridge width RW is less than one tenth arm width AW.

As shown in FIG. 12, hole 186 receives bearing 167 to permit rotation of arm body 171 about rod 166. As shown in FIG. 14, resilient member 178 is positioned in notch 177 and resilient member 182 is positioned in notch 181. Wear bar 184 is positioned in wear bar recess 184 and my include interlocking features that retain wear bar 184 in wear bar recess 184 while permitting replacement of wear bar 184 without damaging or altering arm body 171. For example, wear bar 184 may include sufficient resiliency to expand and return to its original shape after passing over a retention feature in wear bar recess 185. Resilient member 178 and 182 may be formed from sections of flexible tubing, for example.

Figure 19:
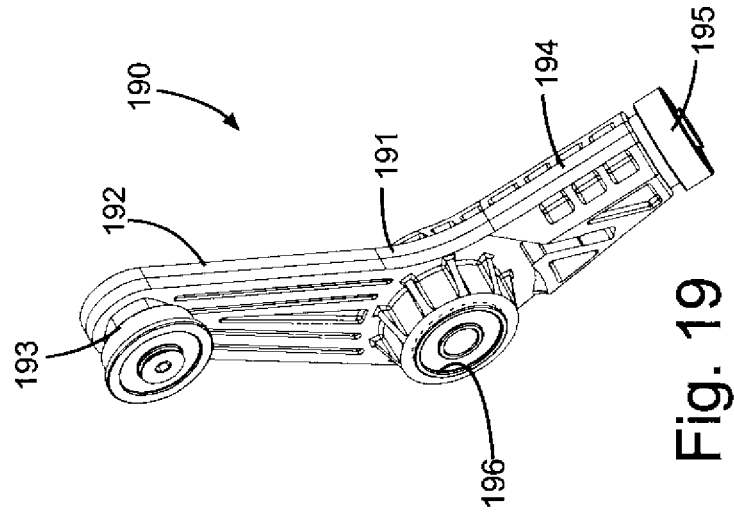
FIG. 19 is a perspective view of a release lever, a component of the FIG. 11 bogie assembly.

Referring to FIG. 19, release lever 190 is illustrated. Release lever 190 includes lever body 191 that includes top arm 192 and bottom arm 194. Top roller bearing is coupled to top arm 192 and bottom roller bearing 195 is coupled to bottom arm 194. Lever body 191 defines hole 196 that can receive a bearing 167 as shown in FIG. 12 to permit release lever 190 to rotate about a rod 166.

Figure 20:
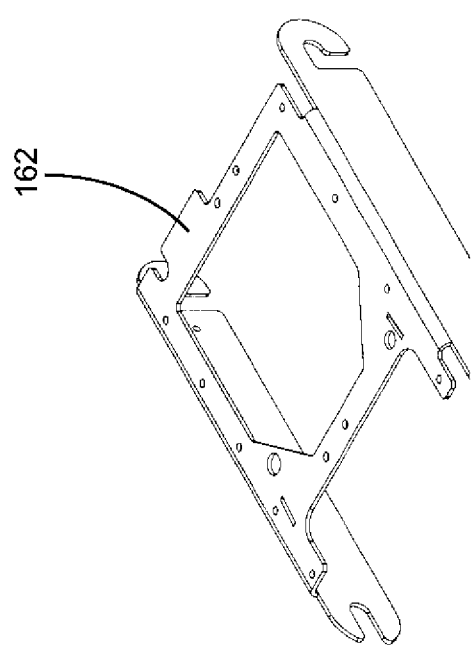
FIG. 20 is a perspective view of a base cart, a component of the FIG. 11 bogie assembly.

Referring to FIG. 20, base cart 162 is illustrated.

Figure 21:
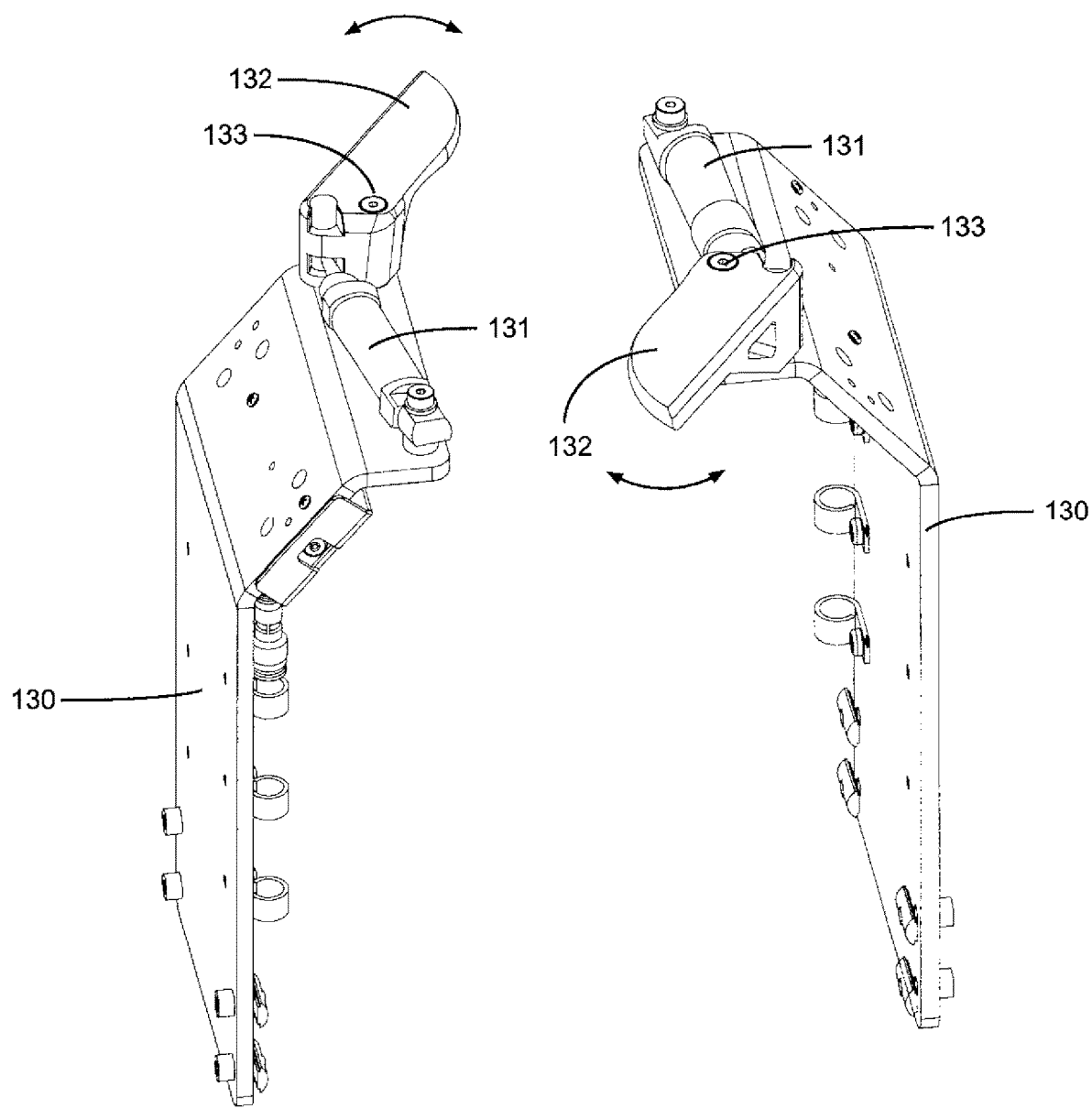
FIG. 21 is a perspective view of right and left side actuator mounts, components of the FIG. 2 conveyor system.
Figure 24:
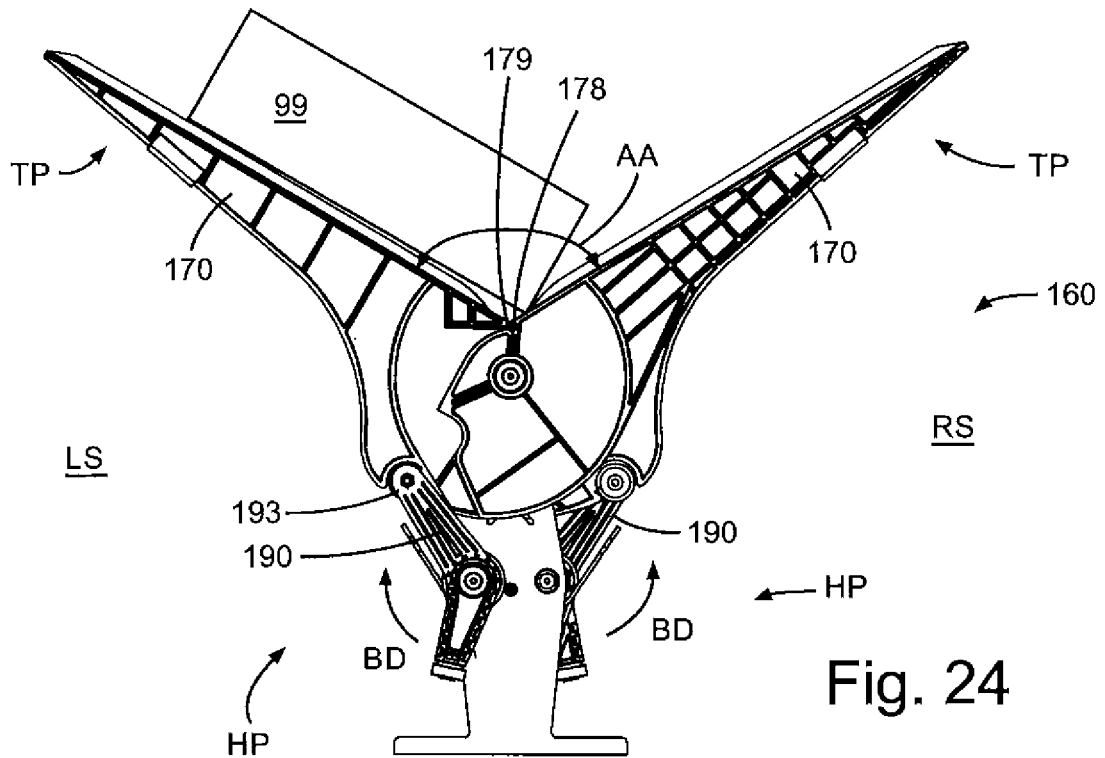
FIG. 24 is an elevational end view of a bogie assembly showing an item being transported with arm assemblies in a transport position.

Referring to FIG. 21, actuator mounts 130 are illustrated. Each actuator mount 130 includes an actuator 131 and an actuator lever 132. Actuators 131 are linear actuators such as pneumatic or hydraulic cylinders, solenoids or other forms of electric linear actuators. Actuator levers 132 are mounted on actuators mounts 130 at pivot points 133. Actuation of actuators 131 cause actuator levers 132 to pivot relative to actuator mounts 130 as indicated by the arrows. Actuator mounts 130 can be mounted in different positions along the length of conveyor 100 to position actuator levers to selectively interact with release levers 190 as described below.

Figure 23:
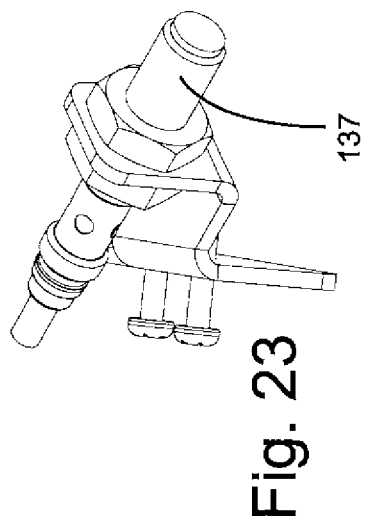
FIG. 23 is a perspective view of a loop sensor, a component of the FIG. 2 conveyor.
Figure 22:
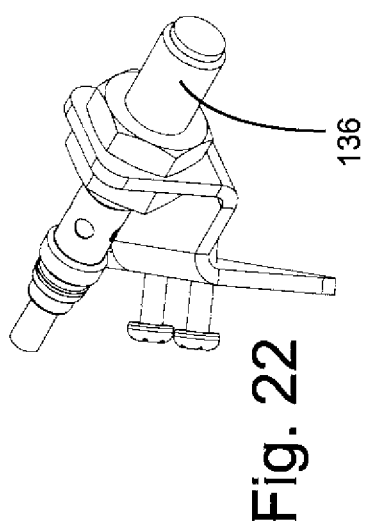
FIG. 22 is a perspective view of an encoder, a component of the FIG. 2 conveyor system.

Referring to FIGS. 22 and 23, arm sensor 136 and loop sensor 137 are illustrated.

Referring to FIGS. 24-27, a sequence is illustrated showing progressive actuation of one arm assembly 170 to drop item 99 off the right side RS of conveyor 100. Starting with FIG. 24, both right and left arm assemblies 170 are positioned in transport position TP transporting item 99. Both right and left arm assemblies 170 are held in an elevated position by release lever 190 that is biased in biasing direction BD to contact top roller bearing 193 against retention notch 172 on each arm assembly 170. The top roller bearing 193 on release lever 190 positioned on right side RS contacts the retention notch 172 on the arm assembly 170 that extends on the left side LS. Similarly, the top roller bearing 193 on release lever 190 positioned on left side LS contacts the retention notch 172 on the arm assembly 170 that extends on the right side RS. As shown in FIG. 14, both release levers 190 are positioned in a hold position HP that maintains top roller bearings 193 in contact in retention notches 172 on arm assemblies 170. Release levers 190 and top roller bearings 193 bear against retention notch 172 with sufficient force to maintain arm assemblies 170 in the illustrated transport position while carrying item 99.

Right and left side arm assemblies 170 are arranged in pairs and together define arm angle AA. In the transport position TP, angle AA, as illustrated, is approximately 120 degrees. In the transport position TP, resilient member 178 on the right side RS arm assembly 170 abuts transport shoulder 176 on the left side LS arm assembly 170. Similarly, resilient member 178 on the left side LS arm assembly 170 abuts transport shoulder 176 on the right side RS arm assembly 170.

Figure 25:
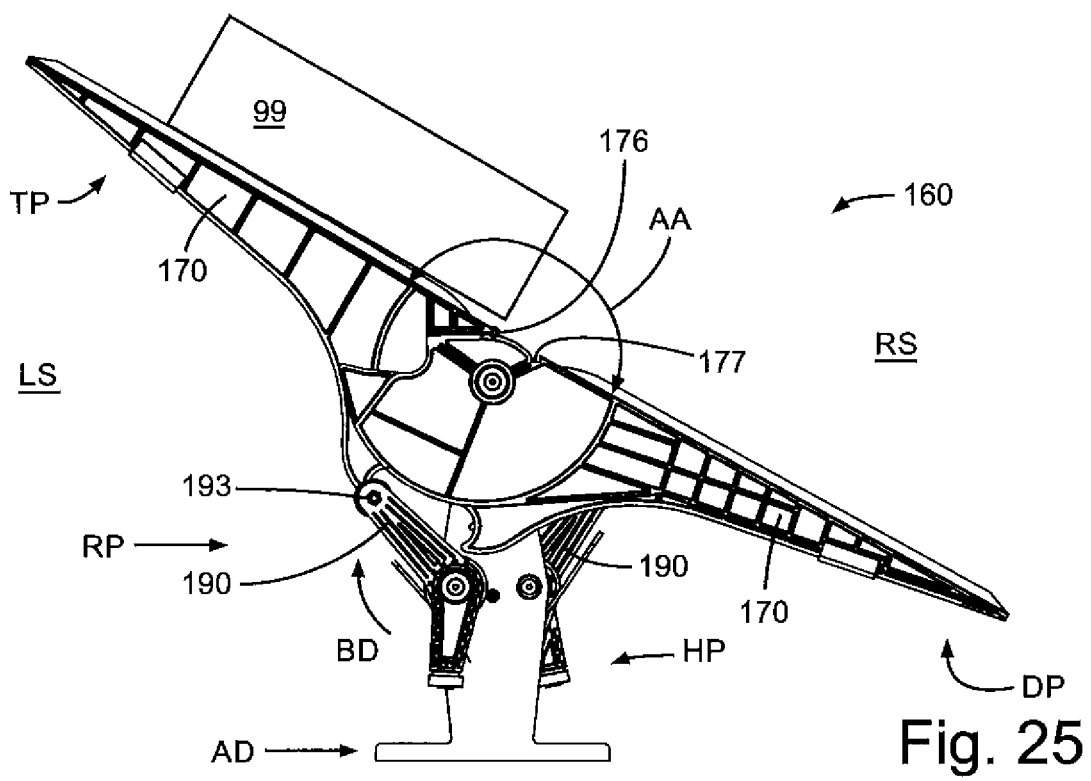
FIG. 25 is a follow-up view to FIG. 24 showing actuation of an arm assembly to begin the process to dump the item off the conveyor.

Referring now to FIG. 25, the first step in actuating an arm assembly 170 is illustrated. The left side LS release lever 190 has been rotated counter clockwise by the application of a force in actuation direction AD against bottom roller bearing 195. The rotation of release lever 190 has removed top roller bearing 193 out of the retention notch 172 for the right side RS arm assembly 170. As a result, the right side RS arm assembly 170 has pivoted clockwise under the force of gravity. Rotation of the right side RS arm assembly 170 is stopped in the illustrated position because the resilient member 182 on the right side RS arm assemblies abuts dump shoulder 183 on the left side LS arm assembly. Similarly, the resilient member 182 on the left side LS arm assemblies abuts dump shoulder 183 on the right side RS arm assembly. The abutment of resilient members 182 and dump shoulders 183 result in angle AA being approximately 180 degrees.

As shown in FIG. 25, the right side RS arm assembly 170 is illustrated in discharge position DP while the left side LS arm assembly 170 is maintained in the transport position TP. The left side LS arm assembly 170 is maintained in the transport position TP due to the weight of item 99 and the continued engagement of the right side RS release lever 190 with the retention notch 172 on the left side LS arm assembly 170.

The force applied to release lever 190 may be from a particular actuator lever positioned in a predetermined position to time the movement of the right side RS arm assembly 170 to drop item 99 into a particular chute 104.

Figure 26:
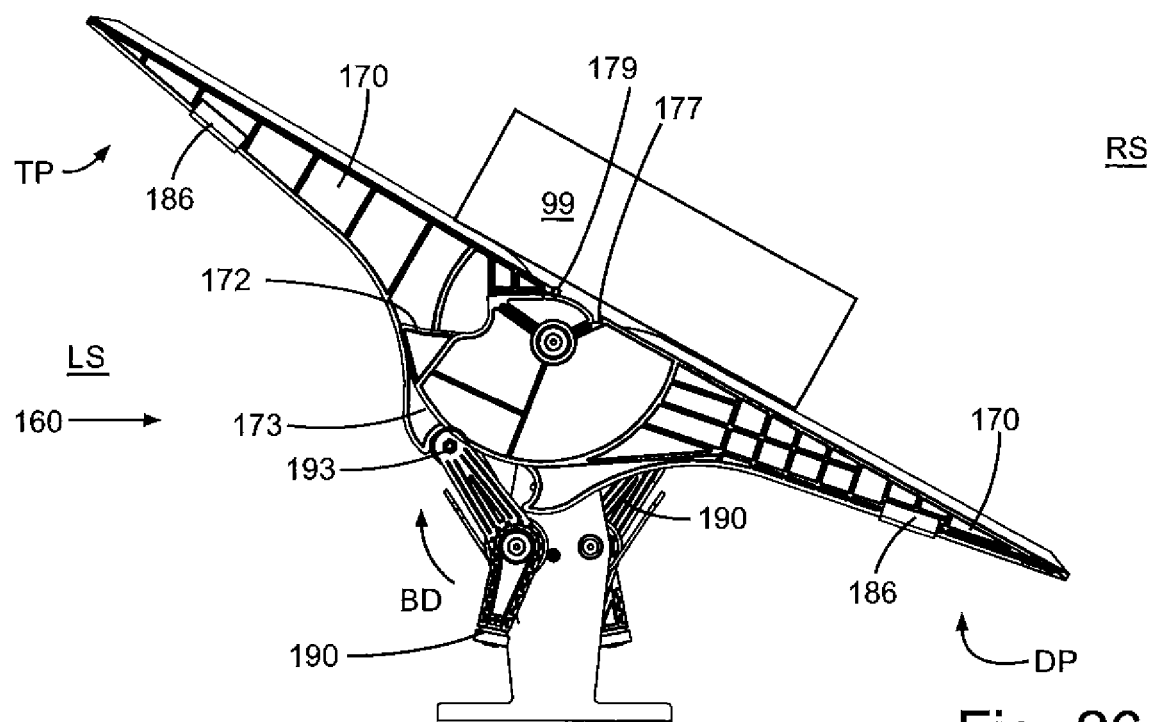
FIG. 26 is a sequential view after FIG. 25 showing movement of the item off the bogie assembly.

FIG. 26 illustrates item 99 sliding down both arm assemblies 170. Also, the force in actuator direction AD has been removed from release lever 190, so release lever has rotated back into contact with the arm assembly 170 with top roller bearing 193 contacting cam surface 173 of the right side RS arm assembly. Cam surface 173 is curved and is progressively closer to hole 186 as it moves away from retention notch 172. The force of top roller bearing 193 pushing against cam surface 173 generates a small rotational force on the right side RS arm assembly 170 that urges the right side RS arm assembly 170 to rotate in a clockwise direction (the same direction that arm assembly 170 moves under the force of gravity).

Figure 27:
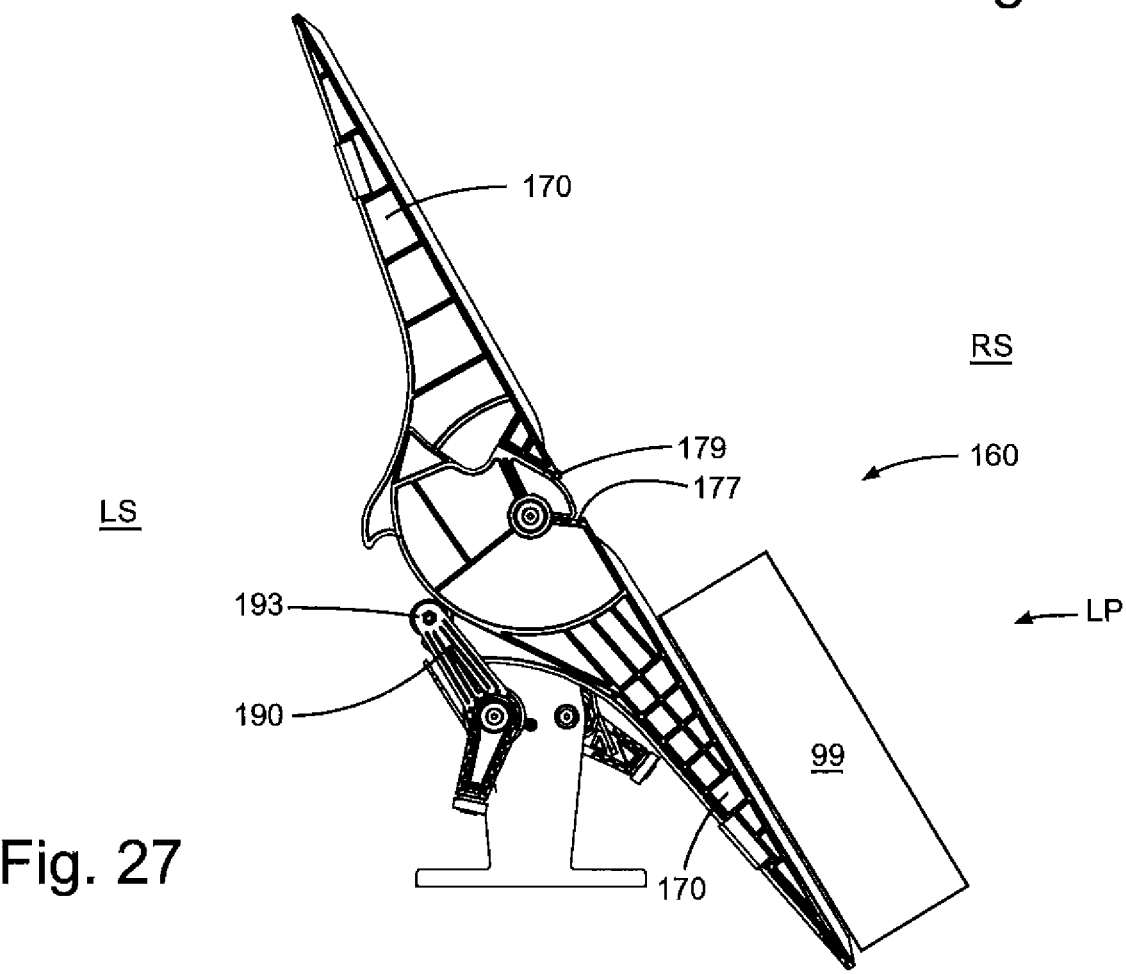
FIG. 27 is follow-up view to FIG. 26 showing the item about to be dumped off the bogie assembly.

FIG. 27 illustrates the final step before item 99 is dumped off arm assemblies 170. As shown, item 99 has slid completely off the left side LS arm assembly 170 onto the right side RS arm assembly 170 causing additional clockwise rotation of the right side RS arm assembly 170. The right side RS arm assembly rotates under the force of item 99 until the left side LS top roller bearing 193 contacts stop notch 174 on the right side RS arm assembly 170. The continued abutment of resilient members 182 and dump shoulders 183 maintains angle AA at approximately 180 degrees and results in the left side LS arm assembly 170 also rotating in a clockwise direction.

Once released, arm assemblies 170 will generally maintain their position after item 99 drops off. When bogie assemblies 160 reach the end of the top of the track circuit they travel downwardly for the return portion of the loop, travelling upside down. Reset rails 128 shown in FIG. 10 ride against wear bars 184 on arm assemblies 170, urging arm assemblies 170 back into their transport position TP, abet while bogie assemblies 160 are upside down. As a result, arm assemblies are actuated between transport position TP and discharge position DP without any powered actuator assembly being located on bogie assemblies 160. This is advantageous because it eliminates the difficulty of mounting a powered actuator on a moving bogie. In the illustrated system, all the powered actuators are located in fixed positions, simplifying the provision of power to the powered actuators.

Figure 28:
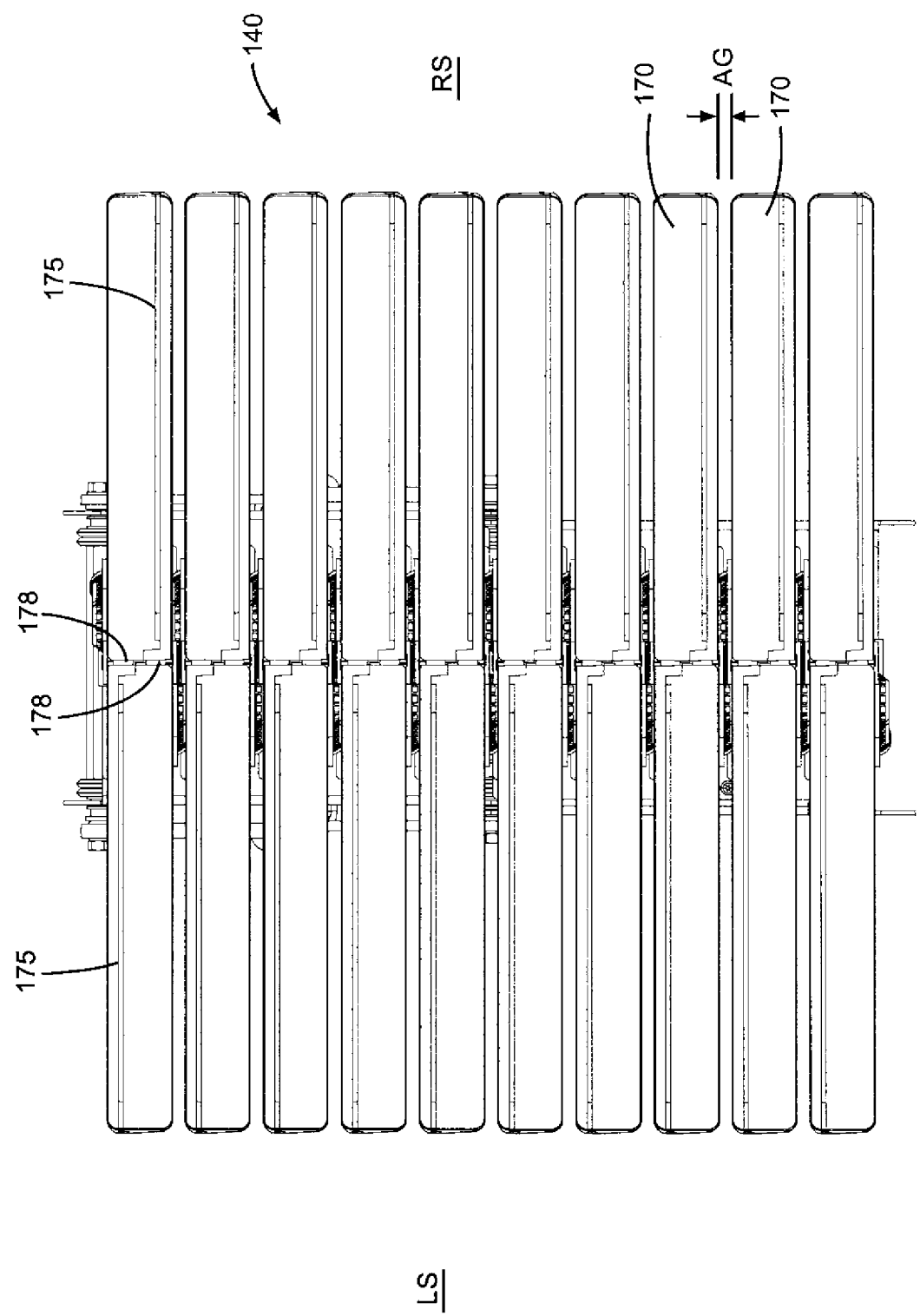
FIG. 28 is a top plan view of the master link assembly of FIG. 7.

Referring to FIG. 28, a top view of master assembly 140 is shown illustrating the alignment of right side RS arm assemblies 170 with left side LS arm assemblies 170. Gap AG is constant across the width of the right side RS arm assemblies 170 and the left side LS arm assemblies 170. Arm assemblies 170 may be identical as illustrated, with the left side LS arm assembly 170 rotated relative to the right side RS arm assembly 170 to interface as illustrated.

Figure 29:
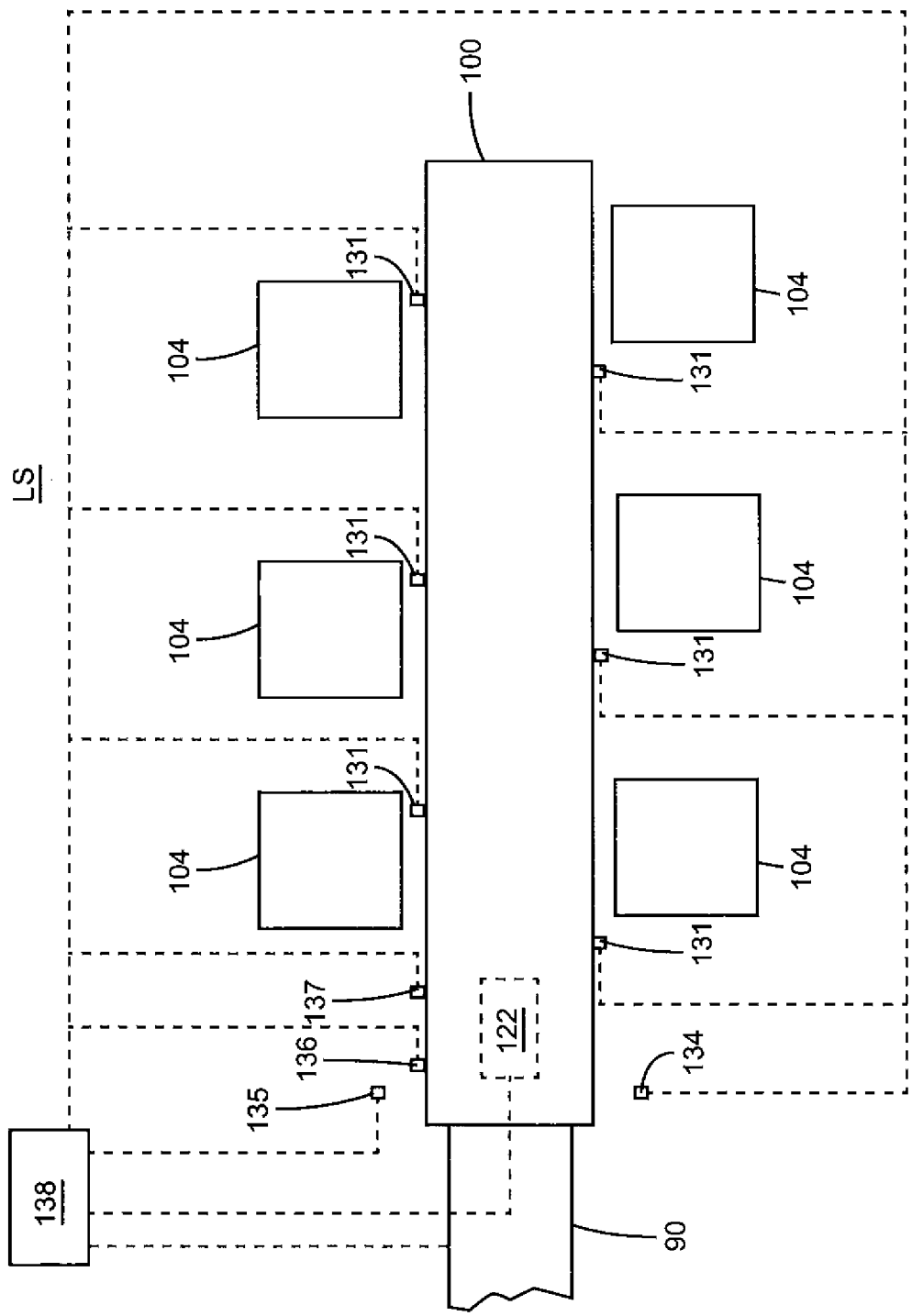
FIG. 29 is a schematic view of the control system of the FIG. 2 conveyor.

Referring to FIG. 29, a general schematic view of the control system for conveyor 100 is illustrated. Controller 138 controls conveyor 100. Controller 138 may be any type of computerized controller desired including, but not limited to, a computer, a programmable logic controller (PLC). As shown in FIG. 29, controller 138 communicates with conveyor 90, motor 122 on conveyor 100, item sensor emitter 134, item sensor receiver 135, arm sensor 136, loop sensor 137 and actuators 131. In the case of an electrically operated actuator, controller 138 could communicate directly with actuators 131. In the case of pneumatically or hydraulically operated actuators, controller 138 may communicate with valves or other control mechanisms (not illustrated) that control the actuator of actuators 131.

Individual actuators 131 are associated with individual chutes 104 (that are positioned on the opposite side of conveyor 100). Controller 138 is programmed to associate individual actuators 131 with individual chutes 104 which are further associated with particular sort destinations. Controller 138 is further programmed with additional information including the length of track circuit 110 and the total number of arm pairs in conveyor 100.

Controller 138 communicates with conveyor 90, which feeds items to conveyor 100. Controller 138 may receive information such as the time an individual items is discharged from conveyor 90 onto conveyor 100, size of individual items, destination information (associated with an individual chute 104), by way of example.

Controller 138 communicates with item sensor receiver 135, arm sensor 136 and loop sensor 137. Arm sensor 136 provides information related to the position of individual arms while loop sensor 137 provides a check that arm sensor 136 detects every arm, as the total number of arms in one loop is preprogrammed. In the event that the count does not match the programmed number, controller 138 may be programmed to reset its arm count based on information from loop sensor 137. Item sensor receiver 135 provides information to controller regarding which gaps AG items are detected in. Combined with the information from conveyor 90 controller 138 can associate individual items with groups of arm pairs that carry the individual item.

Using continuous information from arm sensor 136, controller 138 tracks the longitudinal position of the arm pairs carrying a particular item. When the first arm carrying an item approaches the destination chute 104, the particular actuator 131 for the destination chute is activated as long as necessary for all the arm pairs associated with the item to pass by the actuator. Once the last arm pair passes, actuator 131 is deactivated, preventing further release of the arms of conveyor 100. In this way, only the arm pairs actually carrying an item are actuated. This configuration permits dense item density on conveyor 100 (compared with known prior art) as only a minimal gap is required between sequential items being sorted on conveyor 100.

Figure 30:
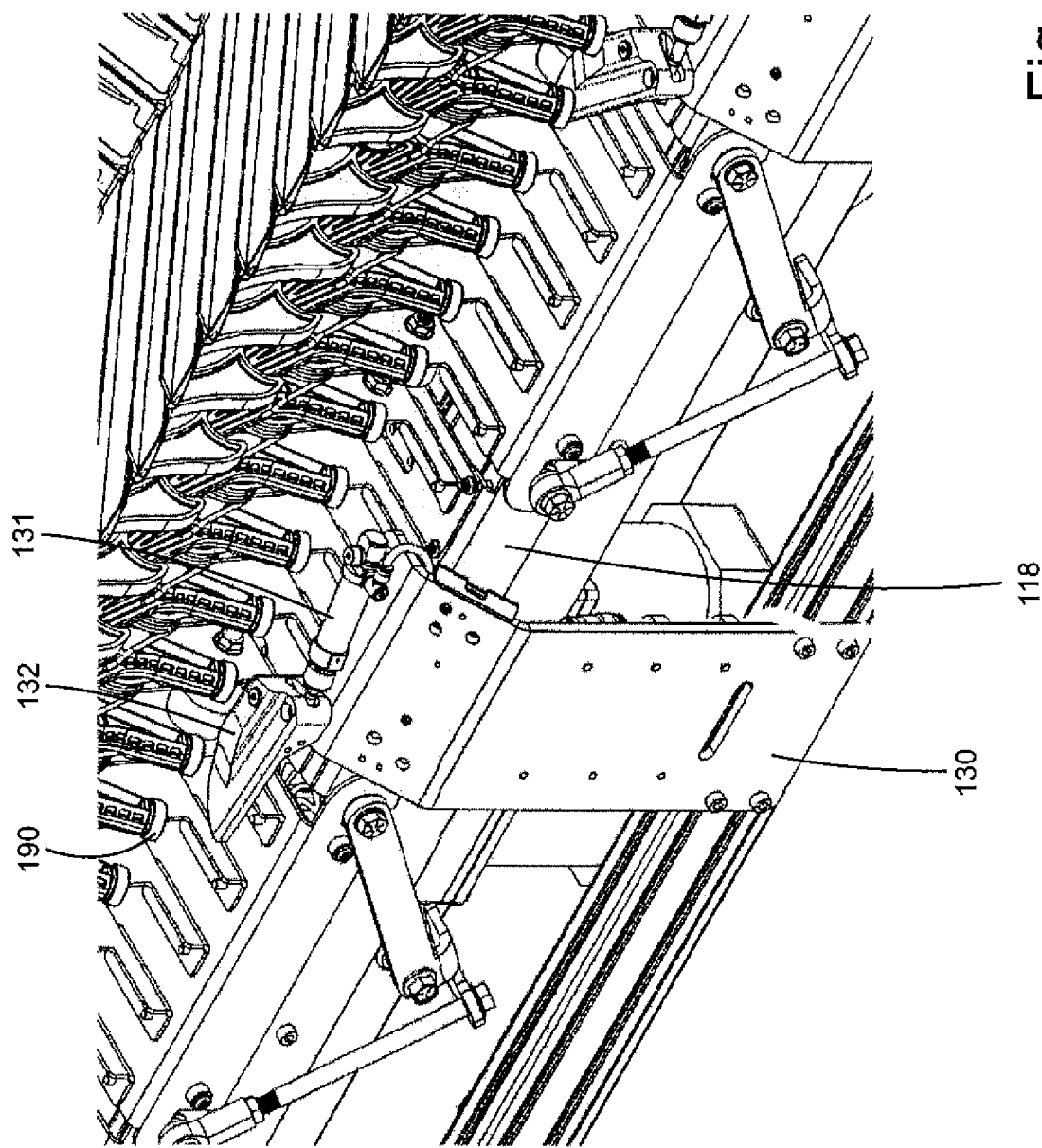
FIG. 30 is a perspective view of a portion of the FGI. 1 sorting conveyor system illustrating an actuator assembly.

Referring to FIG. 30, actuator mount 130 is illustrated mounted on right track 118. Actuator mount 130 includes actuator 131 and actuator lever 132 positioned to engaged release levers 190 when actuator 131 is actuated.

While conveyor 100 disclosed above is configured for dual sided operation, including the capacity to discharge items on either side of conveyor 100, it should be understood that many of the improvements disclosed above with regard to conveyor 100 could be used with a conveying system that only dumps on one side of the conveyor. In some circumstances, it is advantageous to be able to dump to either side. However, in other circumstances, there may not be sufficient width available to access container on both sides of the conveyor. In such a situation, a conveyor could be configured with similar principles retaining and releasing arms, limited to once side, to reduce the width necessary for an installation. It should also be noted that conveyor 100 disclosed above is functional to dump to only one side if desired.

The system disclose above provides several advantages over many prior art systems. For example, by using relatively narrow arms, the system can maximize throughput when sorting items with varying sizes. Systems that use fixed length "buckets" are limited by the length of those buckets. If the buckets are large enough to handle large items, then the throughput is limited when sorting small items. Conversely, if small buckets are used, then the system would not be able to handle larger items. Using a large number of individually actuatable arms permits maximum utilization of the conveyor which maximizes throughput, an important consideration of a sorting system In addition, the above disclosed system utilizes gravity to power actuating of the arms, both to dump items being sorted and to reset the arms after the item has been sorted. This greatly simplifies the system as the power actuators can be provided at fixed positions, which greatly simplifies providing power, such as electricity or air, as well as the required control signal to initiate sorting an item.

Any theory, mechanism of operation, proof, or finding stated herein is meant to further enhance understanding of the disclosed occlusion device, and is not intended to limit the claimed invention in any way to such theory, mechanism of operation, proof, or finding. While the claimed invention has been illustrated and described in detail in the drawings and foregoing description, the same is to be considered as illustrative and not restrictive in character, it being understood that only selected embodiments have been shown and described and that all equivalents, changes, and modifications that come within the spirit of the disclosed shackles as defined herein or by the following claims are desired to be protected.

We claim:

1. A device for sorting an item into a plurality of right side containers and a plurality of left side containers, the device comprising:
   a plurality of interconnected bogie assemblies movable in a direction along a path, each of the bogie assemblies comprising:
   a base movable along the path;
   a right arm rotatable mounted on the base and pivotally movable between a transport position and a discharge position, wherein the right arm defines a right transport side that is positioned on an opposite side from said base and wherein the right arm does not include any containment walls such that the item being sorted can span a plurality of the right arms across a plurality of the bogie assemblies;
   a left arm rotatable mounted on the base and pivotally movable between the transport position and the discharge position, wherein the left arm defines a left transport side that is positioned on the opposite side from said base and wherein the left arm does not include any containment walls such that the item being sorted can span a plurality of the left arms across a plurality of the bogie assemblies;
   a right release that holds the right arm in the transport position, wherein, in the absence of the right release holding the right arm in the transport position, the right arm moves to the discharge position and wherein actuation of the right release releases the right arm to move to the discharge position; and
   a left release that holds the left arm in the transport position, wherein, in the absence of the left release holding the left arm in the transport position, the left arm moves to the discharge position and wherein actuation of the left release releases the left arm to move to the discharge position;
   wherein, when both the right and left arms are in the transport position, the bogie assemblies move the item in the direction along the path;
   wherein actuation of the right release dumps the item into one of the right side containers located on a right side of the path; and
   wherein actuation of the left release dumps the item into one of the left side containers located on a left side of the path.

2. The device of claim 1, wherein the right and left arms share an axis of rotation.

3. The device of claim 1, wherein the right and left releases are levers that are rotatably mounted on the base and are pivotally movable relative to the base between a retention position and a release position.

4. The device of claim 3, further comprising a right biasing member that biases the right release toward the retention position and a left biasing member that biases the left release toward the retention position.

5. The device of claim 3, wherein the right and left arms define a retention notch that receives the right or left side releases.

6. The device of claim 4, wherein the right and left arms define a cam surface that the right or left releases act on when the right or left releases are not in the retention position, and wherein a biasing force acting on the right or left releases pushes the right or left release against the cam surface thereby urging the right or left arm toward the discharge position.

7. The device of claim 1, wherein the plurality of interconnected bogie assemblies are arranged in a vertical loop with a number of the interconnected bogie assemblies oriented upside-down and moving in an opposite direction.

8. The device of claim 7, further comprising a right reset rail and a left reset rail positioned to interface with the upside-down bogie assemblies to urge left and right arms into the transport position.

9. The device of claim 1, wherein the bogie assemblies do not comprise a powered actuator.

10. The device of claim 1, wherein the right and left arms are identical and are interchangeable.

11. The device of claim 1, wherein the right and left arms each have a transport length that extends perpendicular to the direction and a transport width that extends parallel to the direction, wherein the transport length of each arm is at least 3 times the transport width of each arm.

12. The device of claim 11, wherein each of the right and left arms has a ridge that protrudes away from and extends along the length of each of the right or left arms, wherein said ridge is positioned on the right or left transport sides of said right or left arm and wherein each of the ridges has a width that is less than one tenth the transport width of each of the arms.

13. The device of claim 1, further comprising a plurality of right side actuators and a plurality of left side actuators, wherein each of the right side actuators are positioned to selectively actuate the right release to dump the item into a particular one of the right side containers and wherein each of the left side actuators are positioned to selectively actuate the left release to dump the item into a particular one of the left side containers.

14. The device of claim 1, wherein the right arm defines a right transport shoulder that abuts a left transport shoulder on the left arm when the right and left arms are in the transport position.

15. The device of claim 14, wherein said right and left transport shoulders block the right arm from moving closer than approximately 120 degrees relative to the left arm.

16. The device of claim 1, wherein the right arm defines a right dump shoulder that abuts a left dump shoulder on the left arm when either the right or left arm is in the discharge position.

17. The device of claim 16, wherein the right and left dump shoulders block the right arm from moving more than approximately 180 degrees relative to the left arm.

18. The device of claim 1, further comprising a first sensor that detects the passage of each of the bogie assemblies as they pass the first sensor while moving in the direction.

19. The device of claim 18, wherein the right arm and the left arm are paired so as to substantially overlap along the direction.

20. The device of claim 19, wherein sequential pairs of right and left arms are separated by a gap of at least 0.5 inches (1.3 cm).

21. The device of claim 20, further comprising a second sensor adapted to detect the item when the item is positioned in the gap between sequential pairs of the right and left arms.

22. The device of claim 21, further comprising a controller that receives information from the first and second sensors, wherein the controller is programmed to correlate the item to the bogie assemblies on either side of the gaps where the item is detected by the second sensor.

23. The device of claim 22, further comprising an input conveyor that discharges the item onto the device, wherein the controller is adapted to receive destination information related to which particular right or left side container the item belongs.

24. The device of claim 23, further comprising a plurality of right side actuators and a plurality of left side actuators, wherein each of the right side actuators is positioned to selectively actuate the right release to dump the item into a particular one of the right side containers and wherein each of the left side actuators is positioned to selectively actuate the left release to dump the item into a particular one of the left side containers, wherein the controller is programed to actuate a particular one of the right or left side actuators based on the correlation of the item to the boogie assemblies and the destination information.

25. The device of claim 1, wherein each of the bogie assemblies include a plurality of the right arms each individually paired with a plurality of the left arms.

* * * * *